US006969174B1

(12) United States Patent
Radulescu

(10) Patent No.: US 6,969,174 B1
(45) Date of Patent: Nov. 29, 2005

(54) APPARATUS AND METHOD FOR VOLUMETRIC IMAGE RECONSTRUCTION OF VOLUMETRIC IMAGES

(76) Inventor: Sorin Radulescu, 408 Grant Ave. #405, Palo Alto, CA (US) 94306

( * ) Notice: Subject to any disclaimer, the term of this patent is extended or adjusted under 35 U.S.C. 154(b) by 173 days.

(21) Appl. No.: 10/382,241

(22) Filed: Mar. 3, 2003

(51) Int. Cl.[7] ......................... G03B 21/14; G02B 27/22
(52) U.S. Cl. ........................... 353/7; 359/462; 359/475
(58) Field of Search ................................ 353/7, 10, 28, 353/30, 94; 359/462, 467, 475, 477, 478; 348/42, 44, 51

(56) References Cited

U.S. PATENT DOCUMENTS 4,323,920 A * 4/1982 Collender .................... 348/51
5,082,350 A * 1/1992 Garcia et al. ............... 359/478
5,148,310 A * 9/1992 Batchko ..................... 359/479
5,157,546 A * 10/1992 Williams et al. ............ 359/462
5,161,054 A * 11/1992 Williams et al. ............ 359/462
5,172,266 A * 12/1992 Garcia et al. ............... 359/478
5,418,632 A * 5/1995 Anderson .................... 359/17
5,678,910 A * 10/1997 Martin .......................... 353/7
5,754,147 A * 5/1998 Tsao et al. ..................... 345/6
5,954,414 A * 9/1999 Tsao ............................. 353/7
6,183,088 B1 * 2/2001 LoRe et al. .................... 353/7

* cited by examiner

*Primary Examiner*—William C. Dowling

(57) ABSTRACT

A volumetric display apparatus is disclosed which includes, one or more movable generator means to receive a multitude of light sources, wherein said light sources have a non-linear spatial distribution and are independently accessed for unequal access durations, in which said light sources have multiple-element structure with independent direction and intensity control, in which light blocking means controls a direction and intensity of light beams generated by light sources, and a method employing a psudo-uniform volumetric image space in which volumetric image elements have a sane size.

49 Claims, 36 Drawing Sheets

APPARATUS AND METHOD FOR VOLUMETRIC IMAGE RECONSTRUCTION OF VOLUMETRIC IMAGES

BACKGROUND OF THE INVENTION

1. Field of the Invention

The present disclosure refers to an apparatus and method for reconstruction and displaying of volumetric images in a volumetric space, wherein the voxels created have a multi-directional spatial distribution of light components and images reconstructed have a real depth-of-field characteristic.

2. Prior Art

In recent years there have been several approaches in displaying volumetric images in a three-dimensional space without a need for auxiliary viewing accessories. In one such approach, described in U.S. Pat. No. 4,160,913, a two-dimensional visual display rotates around a central axis to scan a volumetric space. However, the light-emitting diodes residing in a same longitudinal axial plane create a dark area in a center region of a volumetric image. Furthermore, the volumetric image elements which are created have a principal optical axis orthogonal on the plane of the moving visual display, yielding low performance in a center region of the volumetric image from the foreground to the background. The spatial resolution is lower at the extremities of the volumetric space.

In another approach, described in U.S. Pat. No. 6,183,088, a multi-faceted spinning mirror reflects light beams from a linear array of laser diodes into a spinning projection screen. However, a dark area is formed in a center region of the volumetric image and the performance of the display is low in a center region of the foreground of the volumetric image.

In another approach, described in U.S. Pat. No. 6,012,545, a video image generated by a rotating video apparatus is reflected through mirrors to a rotating rear-projection screen. Similar to other projection systems, a dark area is formed in a center region of the volumetric image and the image performance is low in a center region of the foreground of the volumetric image. A volume of the volumetric space is quite limited.

In another approach, described in U.S. Pat. No. 5,954,414, a moving optical-mechanical system projects a series of two-dimensional images on a moving screen. However, calibrating and synchronizing the two moving systems seem quite difficult. The depth resolution depends on the video rate of the video system. If vario-focal optics is used, then the brightness of the image could vary.

In another approach, described in U.S. Pat. No. 6,072,545, an image projector projects a series of images into a multi-surface optical device to generate a first volumetric image. However, the depth resolution depends on the video rate of the projector and on the transparency of the optical elements. If focusing optics is used, then the magnification of the image could vary from background to foreground.

SUMMARY OF THE INVENTION

The present invention is described with several objectives under consideration. In view of above, one objective of the present invention is to provide a device which reconstructs a contiguous image from a left side to a right side, without a dark area in the middle. The volumetric device is provided with non-planar generator frames to which a multitude of light sources is coupled, with the result that the light beams are non-blocking when the generator frame crosses a sight line of a viewer onto a central axis of the device. It is another objective of the present invention to increase an efficiency of the light sources in the center foreground of an image. The volumetric device comprises a multitude of light sources having a principal optical axis in a transversal radial direction on a central axis, with the result that light components are generated in a transversal radial direction when the generator frames scan the volumetric space, increasing an image efficiency in the image foreground. It is yet another objective of the present invention to provide volumetric image elements having a constant arc length from a center to extremities of the volumetric space and even to decrease an arc length of the volumetric image elements from a center to extremities of the volumetric space. Columns of light sources are triggered in different elementary access durations and employ volume partitions in which the voxel arc length is variable, with the result that the spatial definition in the foreground of the reconstructed image is similar to or smaller than in the background. It is another objective to provide a control on the characteristics of transparence and opaqueness of the reconstructed image. Multi-directional light sources having independently controllable light beams are provided to control a direction and a light intensity in an elementary access duration at any spatial coordinate. Further, light blocking means implements directional filtering to increase the degree of control upon a direction and an intensity of light components. It is another objective to create a volumetric image space with a field of view of 360 degrees.

In order to achieve these and other advantages and in accordance with the purpose of the invention, as embodied and broadly described herein, the present invention provides a rotating-type light-generation volumetric display.

BRIEF DESCRIPTION OF THE DRAWINGS

The invention will further be illustrated by reference to the accompanying drawings, in which.

DETAILED DESCRIPTION OF THE PREFERRED EMBODIMENTS

Figure 1:
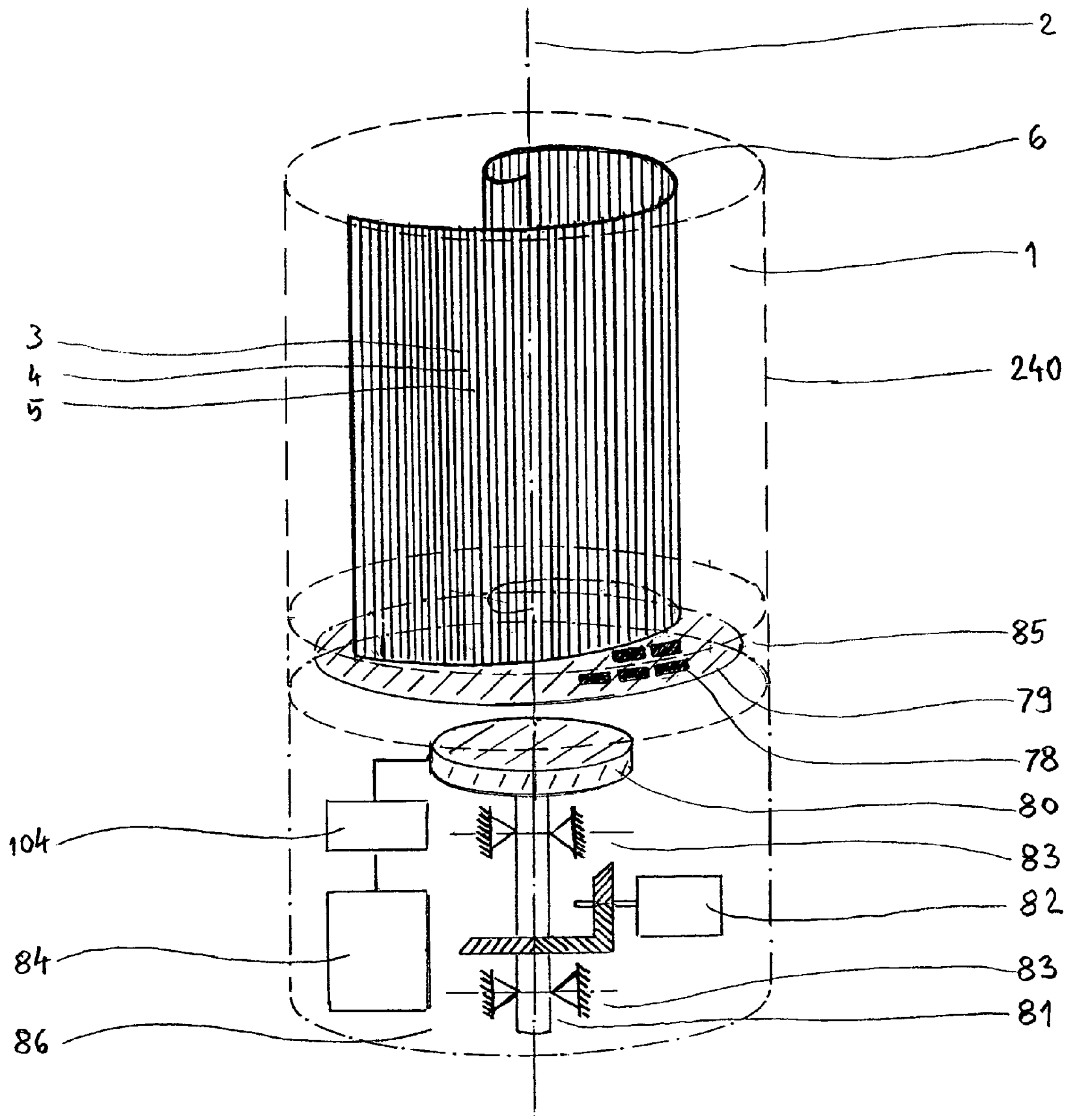
FIG. 1 is a general view of a device according to the preferred embodiment.
Figure 2:
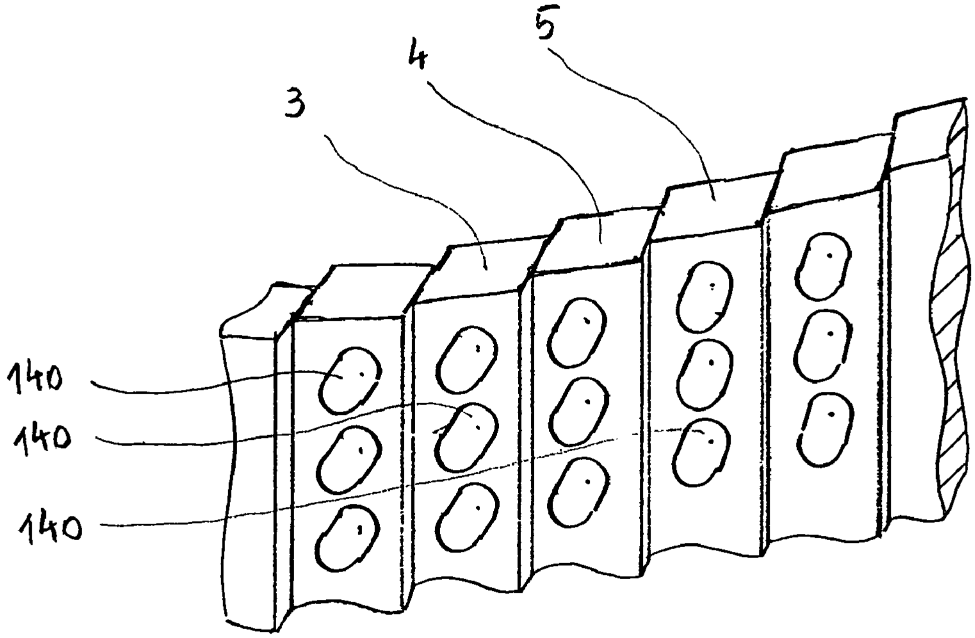
FIG. 2 is a partial view of a generator frame of the device.
Figure 4:
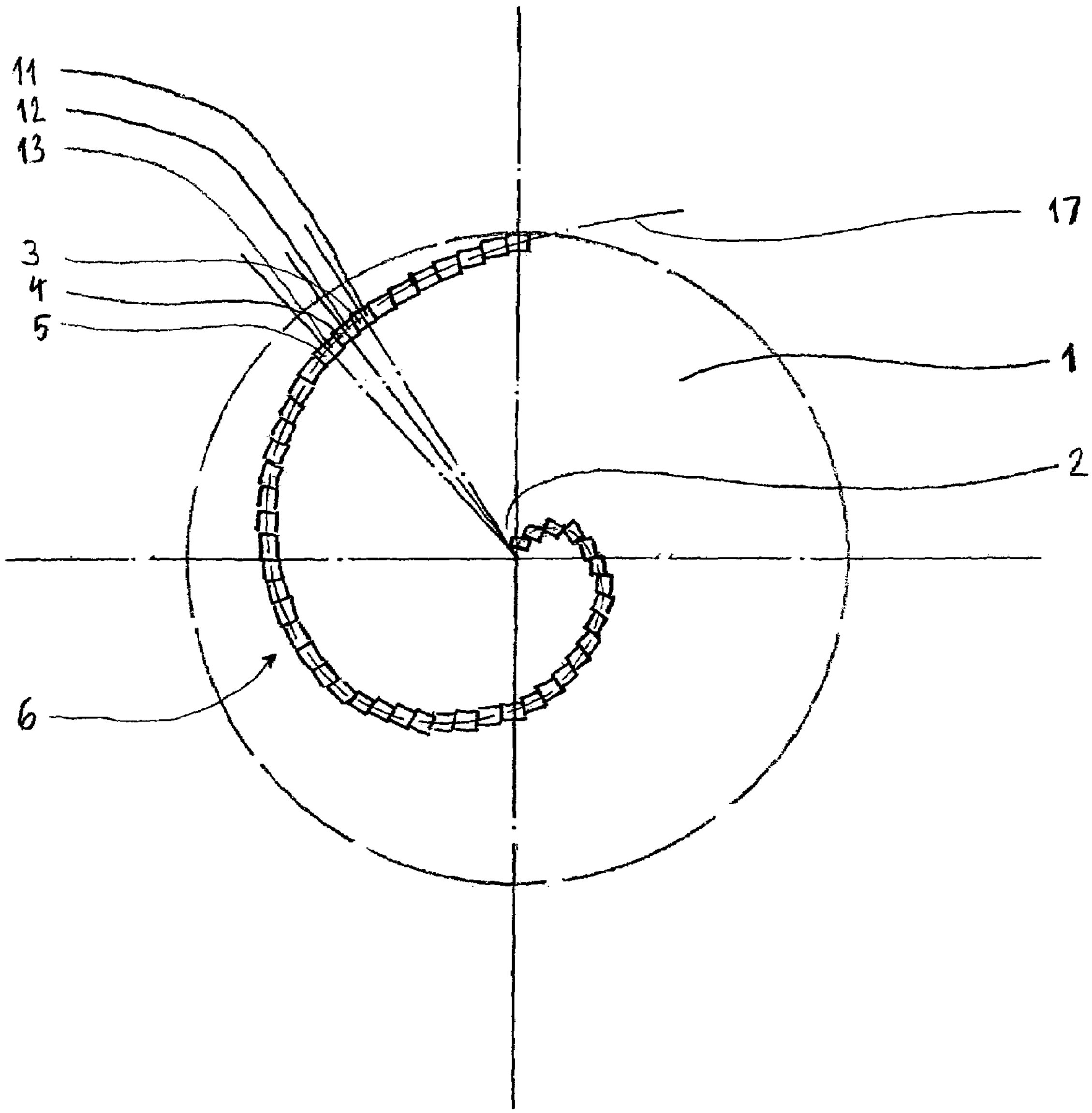
FIG. 4 is a cross-sectional view of the generator frame of the device shown in FIG. 1.
Figure 5:
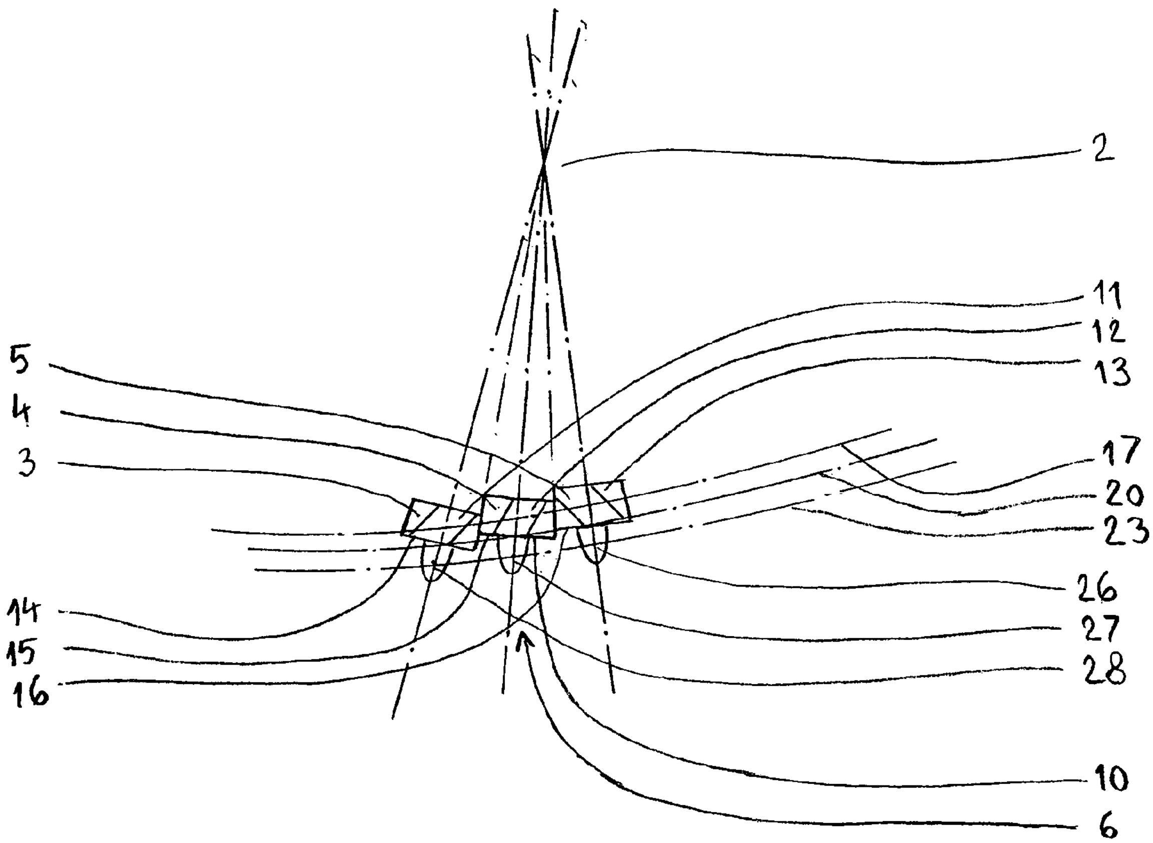
FIG. 5 is a cross-sectional detailed view of the generator frame shown in FIG. 4.

Referring to the drawings, the device for volumetric image reconstruction according to the preferred embodiment of the present invention is shown in FIG. 1. The device (240) has a volumetric space (1) surrounding a central axis (2) and comprises at least two generator elements (3) and (4) located at different distances from the central axis of the device. The generator elements (3) and (4) are not residing in a same longitudinal axial semi-plane on the central axis (2). The generator elements are movable around the central axis and a multitude of light sources (140) are coupled to the generator elements, as shown in FIG. 2. The light sources are not residing in a same longitudinal axial semi-plane. The generator elements are positioned without a distance therebetween and employ a contiguous generator frame (6) having preferably an field of view of 360 degrees. Cross-sections (11), (12) and (13) of three generator elements (3), (4) and (5), respectively, in a transversal plane on the central axis are located on a non-linear curve (17) which extends from a vicinity of the central axis to extremities of the volumetric space, as shown in FIG. 4. Each of the generator elements (3), (4) and (5) has an exterior facet (14), (15) and (16), respectively, which is preferably opposite to the central axis of the device, as shown in FIG. 5. An exterior facet of the generator elements can be orthogonal on a longitudinal axial plane on the central axis. An exterior facet (10) of the generator frame (6) is composed of exterior facets of the generator elements.

A non-linear curve (17) intersects the cross-sections in a transversal plane of generator elements, yielding a pattern line of the generator frame. More particularly, the non-linear curve (17) intersects the centers of the cross-sections of generator elements. The non-linear curve (17) is preferably, but not limited to, a spiral, or an arc of parabola or hyperbola, or an arc of circle or ellipse. Intersections curves of exterior facets (14), (15) and (16) of the generator elements (3), (4) and (5) with a transversal plane yield exterior contours of the exterior facets and are located on a non-linear curve (20) which extends from a vicinity of the central axis to extremities of the device. The non-linear curve (20) intersects the exterior contours in a transversal plane of the exterior facets of the generator elements, yielding a facet line of the generator frame. More particularly, the non-linear curve (20) intersects the centers of the exterior contours in a transversal plane of the exterior facets of the generator elements. The non-linear curve (20) is preferably, but not limited to, a spiral, or an arc of parabola or hyperbola, or an arc of circle or ellipse.

A multitude of light sources is coupled to each of the generator elements, preferably to the exterior facets of the generator elements. The light sources (26), (27) and (28) are coupled to the exterior facets (14), (15) and (16) of the generator elements.

Figure 3:
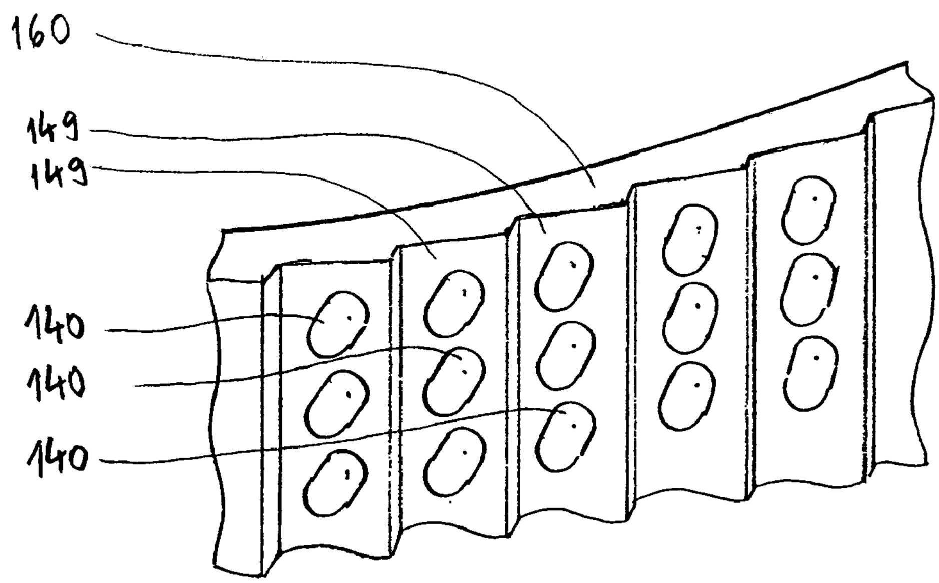
FIG. 3 is a partial view of an alternate generator frame of the device.

Alternately, a generator frame (160) has a plurality of exterior facets (149), as shown in FIG. 3. A plurality of light sources (140) are coupled to the exterior facets of the generator frame (160), wherein the light sources are not residing in a same longitudinal axial semi-plane.

Figure 6:
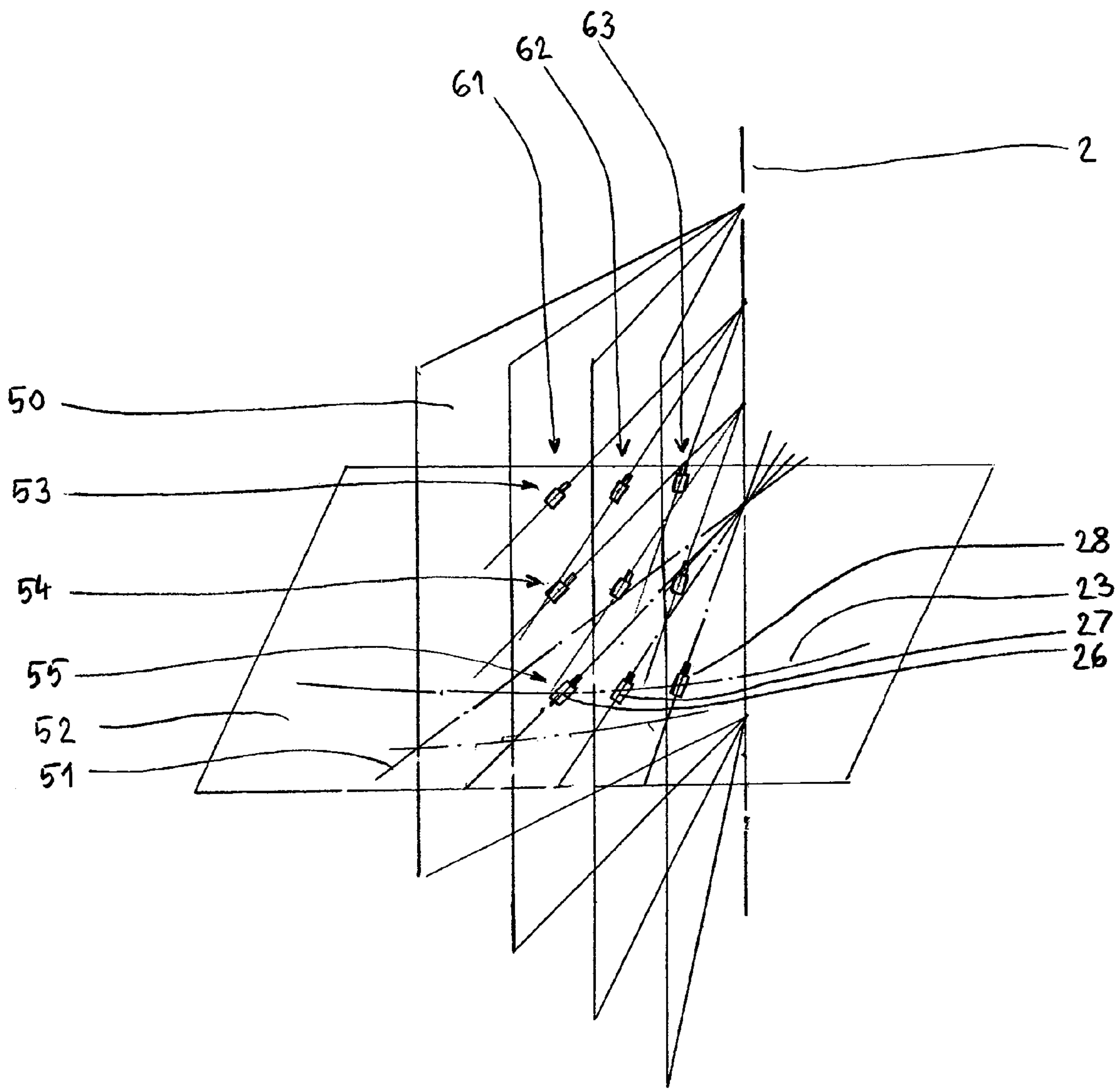
FIG. 6 is a cross-sectional view of a volumetric space of the device showing a spatial distribution of light sources.

The device according to the present invention is composed of at least two rows (53) and (54) of light sources residing in transversal planes on the central axis of the device and of at least two columns (61) and (62) of light sources residing in longitudinal planes on the central axis of the device, as shown in FIG. 6. Intersections of three light sources (26), (27) and (28) of the columns (61), (62) and (63), respectively, of light sources with a transversal plane (52) on the central axis (2) of the device are located on a non-linear curve (23) which extends from a vicinity of the central axis to extremities of the device. The light sources (26), (27) and (28) reside in the row (55) of light sources. The non-linear curve (23) intersects the light sources residing in a transversal plane, yielding a radiation line of the generator frame. Each light source has one or more light source emitters which actually generate light. The non-linear curve (23) intersects the light source emitters of the light sources residing in a transversal plane. The non-linear curve (23) is preferably, but not limited to, a spiral, or an arc of parabola or hyperbola, or an arc of circle or ellipse.

A light beam is generated by a light source in an elementary access duration. An elementary access duration of the light sources is variable, preferably in a transversal plane on the central axis. The light sources residing in different columns of light sources are driven with signals having different elementary access durations. The elementary access duration of the light sources is variable along the rows of light sources. An elementary access duration of the light sources is preferably inverse proportional to a radius of the light sources with respect to the central axis.

Figure 7:
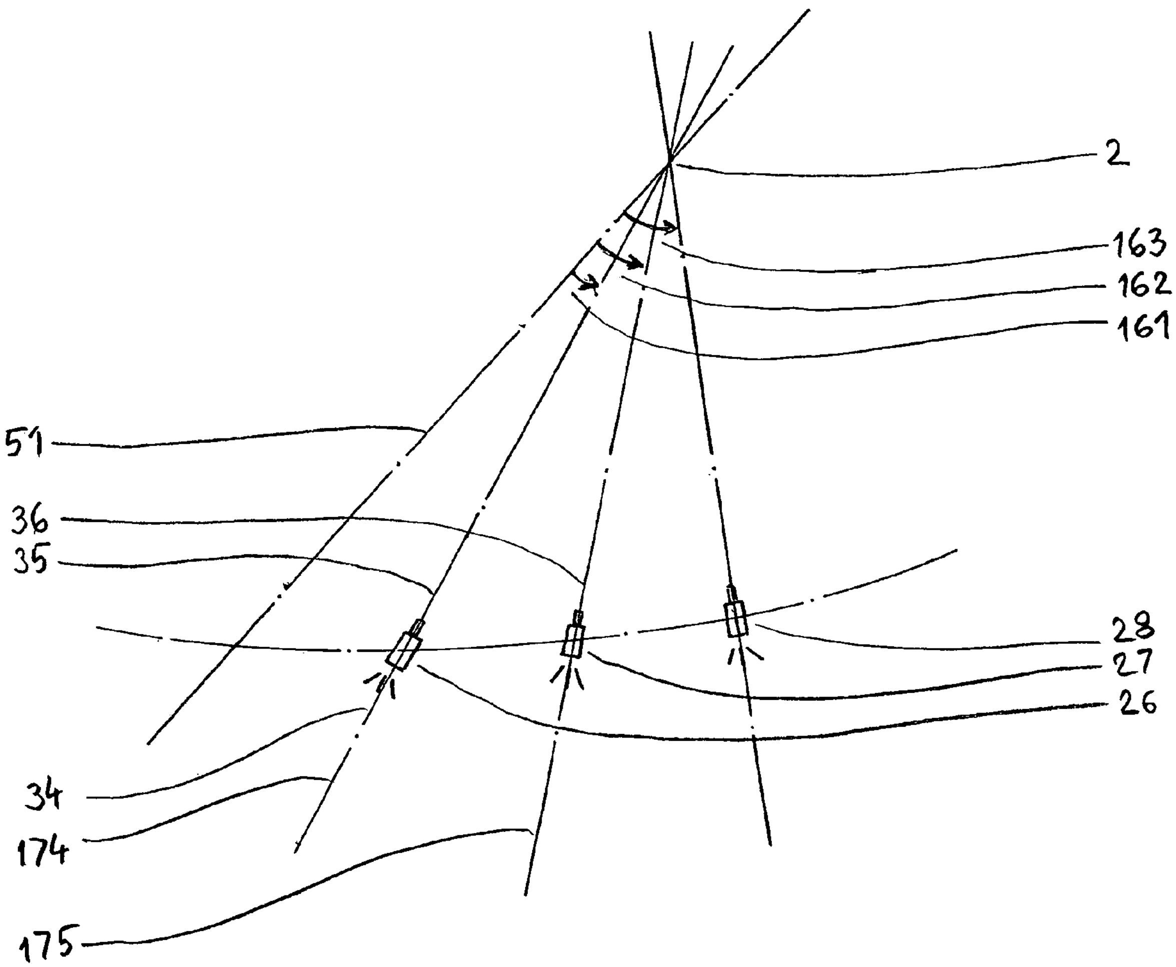
FIG. 7 is a cross-sectional view of an arrangement of light sources of the device shown in FIG. 1.

The light sources (26), (27) and (28) of adjacent columns (61), (62) and (63), respectively, of light sources residing in a transversal plane (52) are located at different angular openings (161), (162) and (163) from a reference longitudinal axial direction (51) with respect to the central axis (2) of the device, as shown in FIG. 7. Similarly, the light source emitters of the light sources (26), (27) and (28) of adjacent columns of light sources residing in a transversal plane (52) are located at different angular openings (161), (162) and (163) from a reference longitudinal axial direction (51) with respect to the central axis (2). A reference longitudinal axial direction (51) is yielded by an intersection of a reference longitudinal axial plane (50) with the transversal plane (52). Adjacent columns (61) and (62) of light sources are not residing in a same longitudinal axial plane. A longitudinal axial semi-plane intersects one column of light sources. A transversal radial direction intersects one row of light sources. A principal optical axis (34) of the light sources is in a transversal radial direction (35) on the central axis of the device. A longitudinal axial semi-plane contains principal optical axes of light sources residing in one column of light sources. A transversal radial direction contains a principal optical axis of one light source residing in a row of light sources. Each light source generates a light beam which propagates along an axis of propagation and has a direction of propagation. An axis of light beam propagation, such as, but not limited to, a center axis or a median-weighted axis or a rms-weighted (root-mean-square) axis, resides within the light beam generated and indicates a spatial localization of the light beam. An axis of light beam propagation can be specified, for instance, by two coordinate points residing on the axis or by an intersection of two planes. A center axis of the light beam propagation intersects symmetry centers of cross-sections of the light beam. A median-weighted axis intersects cross-section points having a median value of illumination energy of the light beam. Thus, a median value of beam illumination energy is yielded along a median-weighted axis of light beam propagation. A rms-weighted axis intersects cross-section points having a root-mean-square value of illumination energy of the light beam. Thus, a root-mean-square value of beam illumination energy is yielded along a rms-weighted axis of light beam propagation. Furthermore, a direction of light beam propagation indicates a spatial region toward which the light beam propagates after being generated by a light source. A direction of light beam propagation can be specified, for instance, by a spatial region or coordinate point toward which the light beam propagates or by a spatial region or coordinate point from which the light beam propagates away. A direction of light beam propagation is opposite to a spatial region or coordinate point from which the light beam propagates away. An axis of light beam propagation (174) of the light source (26) is in a transversal radial direction (35) with respect to the central axis of the device. An axis of light beam propagation (175) of the light source (27) is in a transversal radial direction (36) with respect to the central axis of the device.

Axis of light beam propagation (174) and (175) of adjacent light sources (26) and (27) residing in a same transversal plane (52) are not residing in a same longitudinal axial semi-plane. A longitudinal axial semi-plane contains directions of light beam propagation of light sources residing in one column of light sources. A transversal radial direction contains an axis of light beam propagation of one light source residing in a row of light sources. Each of the light sources (26), (27) and (28) has an unrestricted field of view in an axis of light beam propagation to extremities of the device.

A direction of light beam propagation of the light sources is preferably opposite to a spatial region located in a vicinity of the central axis (2) of the device. Furthermore, an axis of light beam propagation (174) of the light sources and a direction of an optical axis (34) of the light sources are preferably residing in a same longitudinal axial plane.

Light blocking means can be placed in front of the light sources with respect to the central axis, wherein the light blocking means and the light sources reside preferably in a same longitudinal axial plane. Cross-sections of the light blocking means with a transversal plane are located on a non-linear curve. Alternately, the light blocking means can be deposited as a contiguous thin-film liquid crystal light valve on a non-planar surface which follows the non-linear curve of the radiation line of the generator frame. The light blocking means filters or transmits the light beams generated by the light sources, controlling an intensity and an axis of propagation of the light beams generated by the light sources in an elementary access duration. Back light blocking means, such as, but not limited to, controllable shutters or curtains, liquid crystal displays or dark slides, can be used between or behind the light sources.

Figure 8:
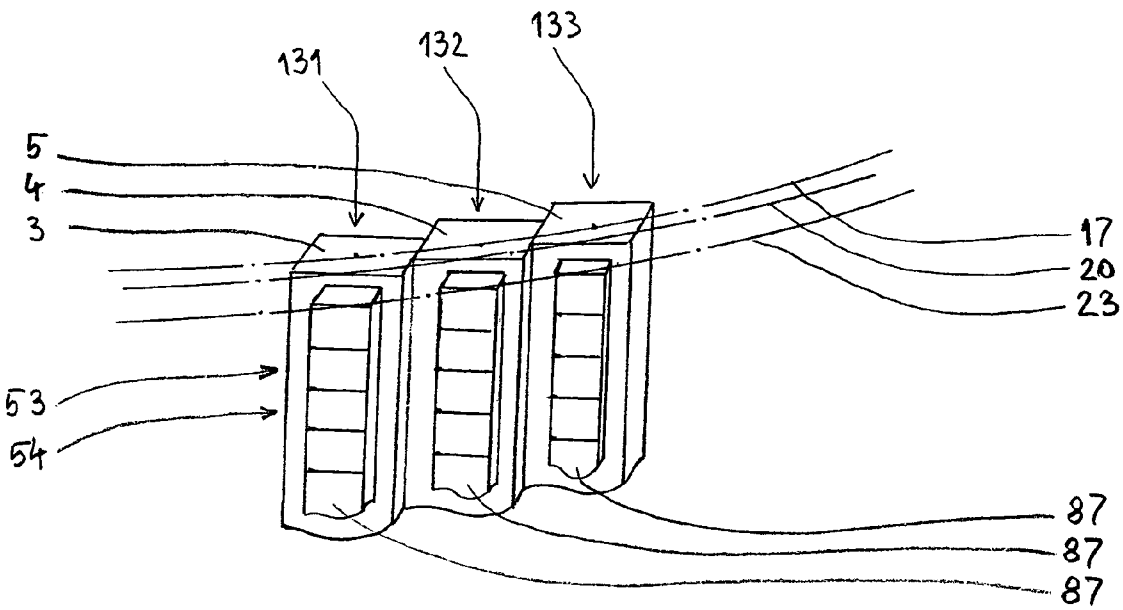
FIG. 8 is a partial view of another alternate generator frame of the device.
Figure 9:
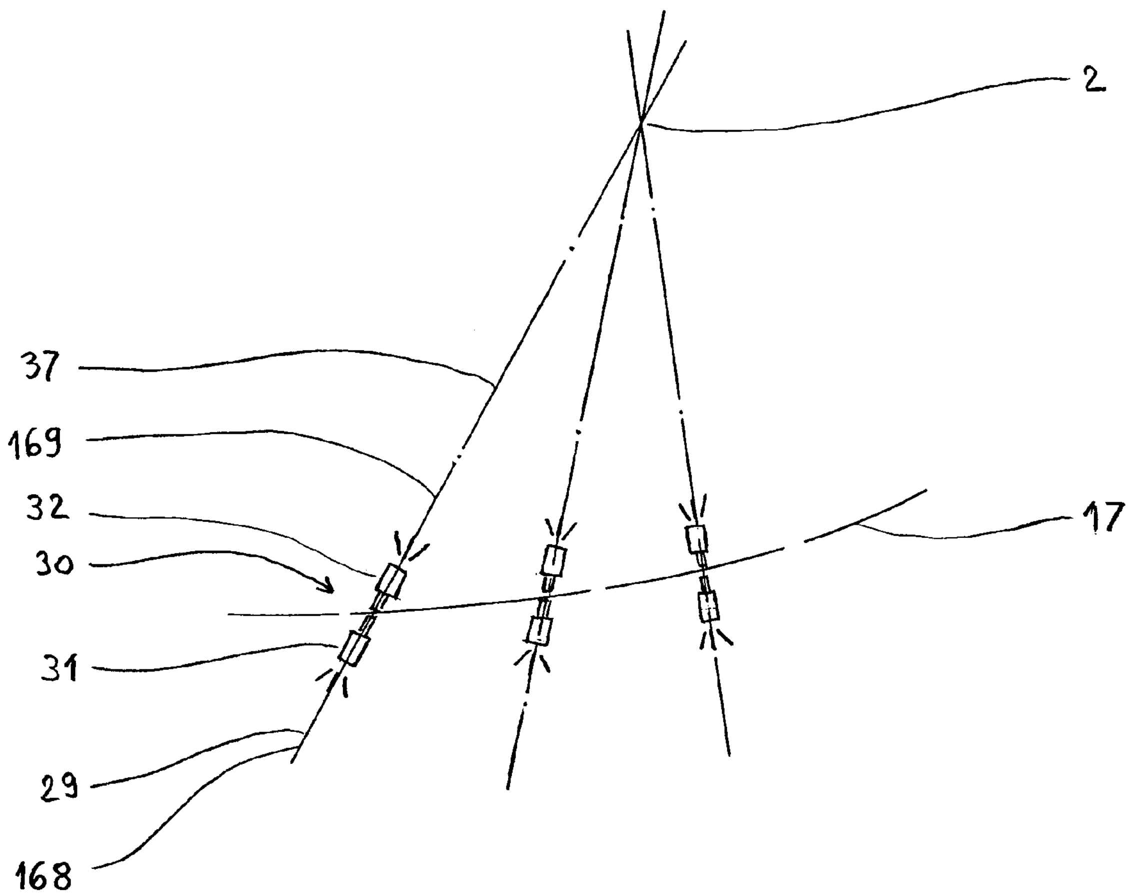
FIG. 9 is a cross-sectional view of an alternate arrangement of light sources of the device.

The rows and columns of light sources are preferably implemented with individual light sources (140). The columns (131), (132) and (133) of light sources can be implemented with linear arrays of light-emitting devices (87), as shown in FIG. 8.

Figure 19:
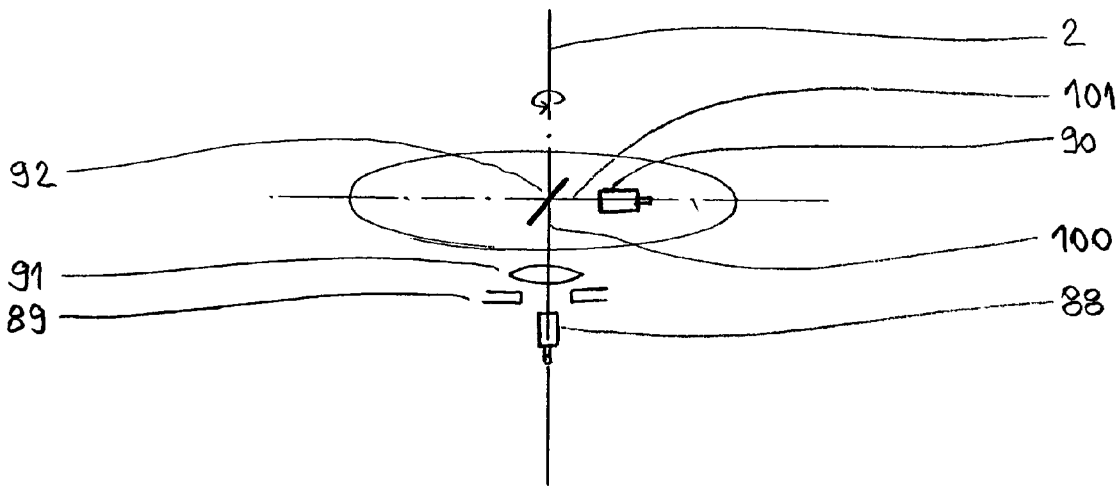
FIG. 19 is a schematic diagram of an optical coupling means.

Alternately, each of the light sources (30) is composed of two light source elements (31) and (32), as shown in FIG. 19. An optical axis (29) of the light source (30) is in a transversal radial direction (37). Axes of light beam propagation (168) and (169) of the light source elements (31) and (32) are in a transversal radial direction, wherein a direction of light beam propagation of one of the light source elements is opposite to a spatial region located in a vicinity of the central axis of the device. Directions of light beam propagation of two of the light source elements are mutually opposite.

Figure 10:
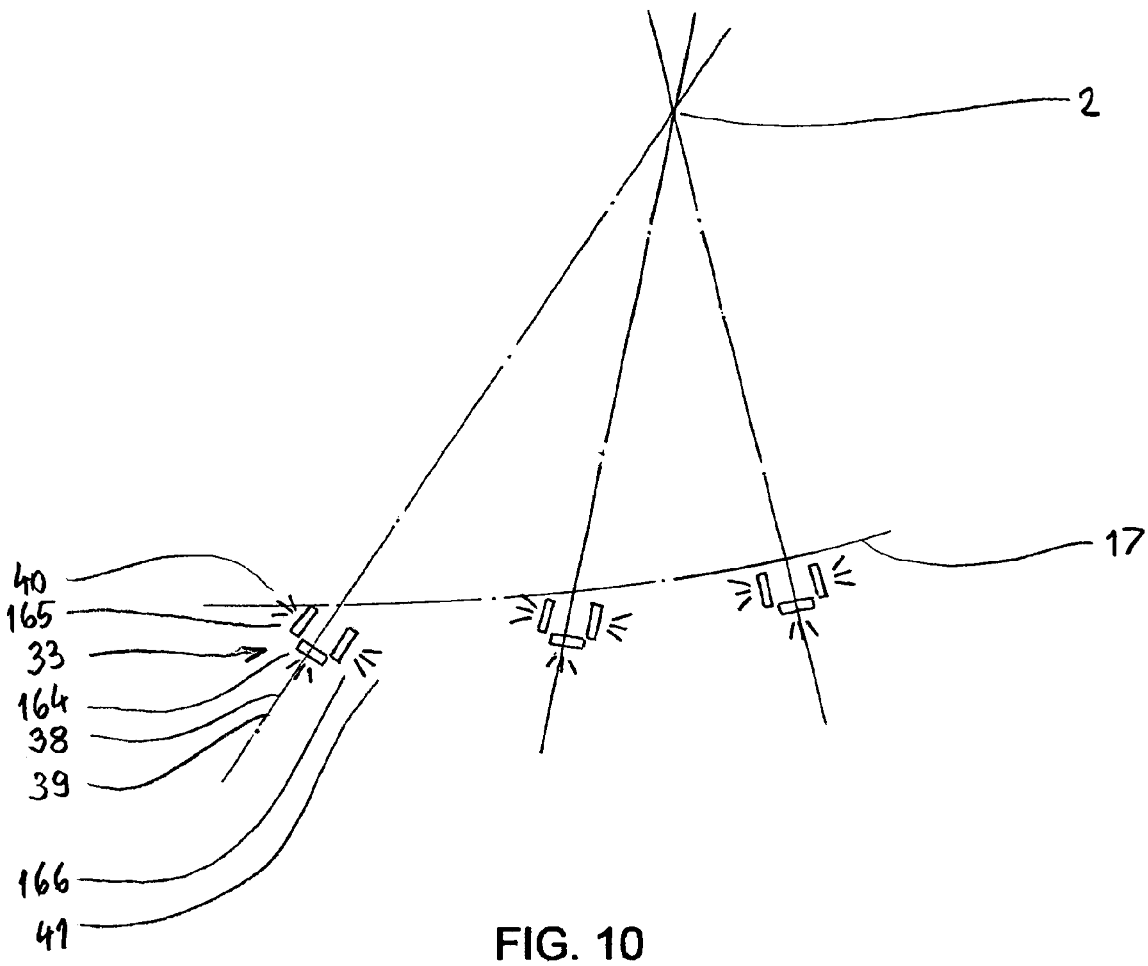
FIG. 10 is a cross-sectional view of another alternate arrangement of light sources of the device.

Alternately, each of the light sources is composed of a multitude of light source elements having preferably circular, rectangular or volume apertures. The light source elements (164), (165) and (166) of the light source (33) are located around a principal optical axis (38) of the light source, as shown in FIG. 10. The light source has multiple axes of light beam propagation. Axes of light beam propagation (39), (40) and (41) of the light source elements are spatially distributed around the principal optical axis of the light source (33) and are preferably contained in a same semi-space of the volumetric space, wherein the field of view of the light source (33) is preferably a semi-space of the volumetric space. Each of the light source elements are individually accessed in an elementary access duration and light beams are independently generated by the light source (33) in an elementary access duration. A spatial independent distribution of light beam directions of a light source implements a dispersive property of a medium in which transmission characteristics, such as transparence and opaqueness, can be controlled.

Figure 11:
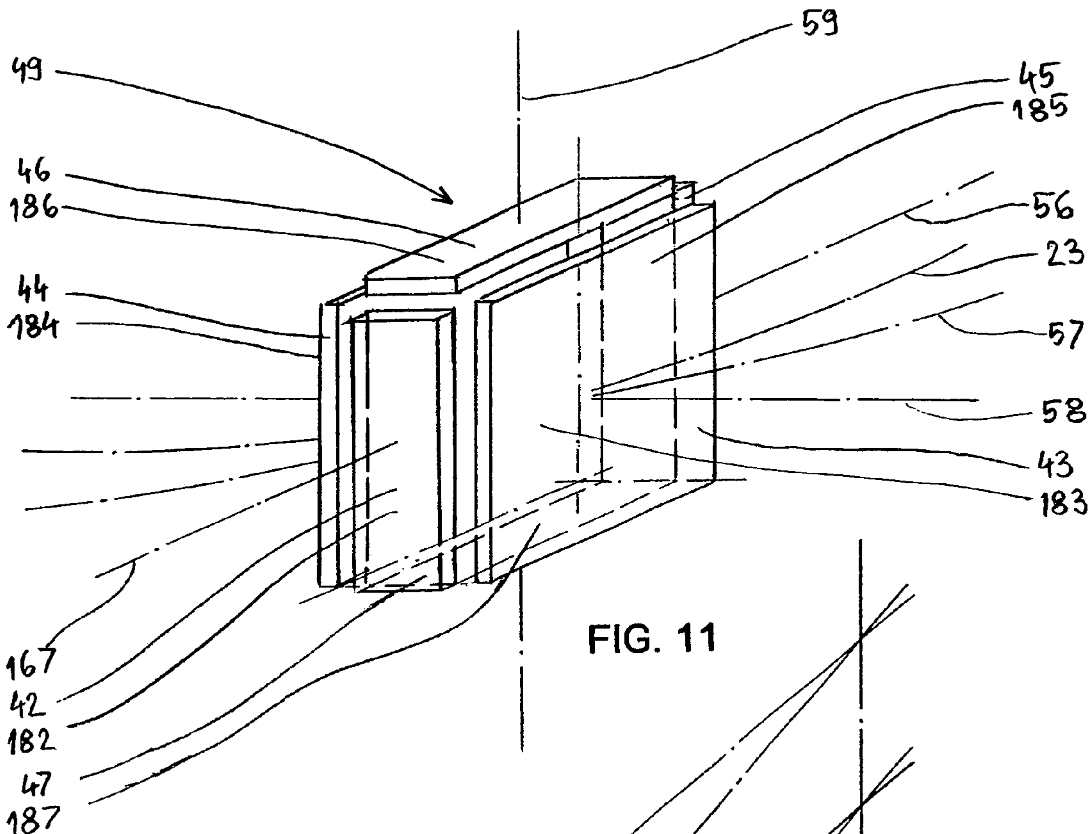
FIG. 11 is a general view of a multiple-element light source.

Alternately, each of the light sources (49) is composed of a multitude of light source elements located in a relation of spatial symmetry with respect to the principal optical axis (167) of the light source (49), as shown in FIG. 11. The light source elements have preferably rectangular apertures and preferably employ a volumetric array of light source elements having a parallelipipaedic shape.

Axes of light beam propagation bf the light source elements (42) and (45) are in a transversal radial direction (56) and directions of light beam propagation of the light source elements (42) and (45) are mutually opposite. The light source elements (42) and (45) have preferably apertures (182) and (185) of a rectangular shape, wherein a height is in a longitudinal direction and a width is in a transversal tangential direction on the central axis. A size of an arc length scanned by the light source (49) in an elementary access duration is preferably similar to a height of the aperture (182) of the light source element (42).

Directions of light beam propagation of the light source elements (43) and (44) are mutually opposite and axes of light beam propagation of the light source elements (43) and (44) are in a transversal tangential direction (58) which is orthogonal on the transversal radial direction (56). The light source elements (43) and (44) have preferably apertures (183) and (184) of a squared shape.

Directions of light beam propagation of the light source elements (46) and (47) are mutually opposite and axes of light beam propagation of the light source elements (46) and (47) are in a longitudinal direction (59) which is orthogonal on the transversal radial direction (56). The light source elements (46) and (47) have preferably apertures (186) and (187) of a rectangular shape, wherein a depth of the aperture is in a transversal radial direction and a width of the aperture is in a transversal tangential direction. A size of an arc length scanned by the light source (49) in an elementary access duration is preferably similar to a width of the aperture (186) of the light source element (46).

The field of view of the light source (49) is the entire volumetric space. A trajectory of movement (57) is traveled by the light source (49) and is a circular curve around the central axis. A transversal direction (58) is tangent to the trajectory of movement (57) in a center region of the light source (49). An instantaneous direction of movement continuously varies as the light source (49) moves around the central axis.

Figure 13:
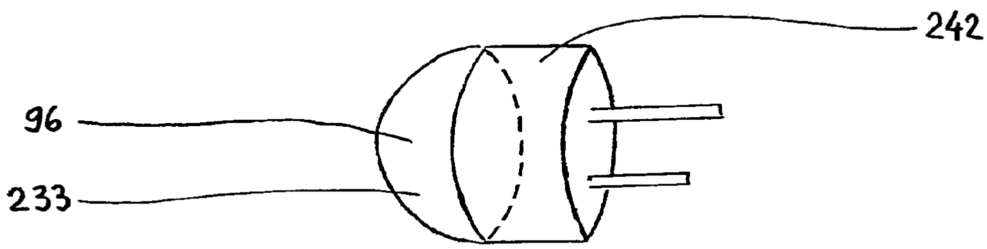
FIG. 13 is a general view of a super-enhanced LED.

The light source (49) scans in an elementary access duration a volumetric image element (180), as shown in FIG. 13. A spatial definition of the volumetric space elements is partly dependent on the physical shape of the light sources and on the placement of the light sources on the generator elements. Light beams are generated by the light source elements in an elementary access duration, wherein a volumetric image element (180) is employed within the volumetric space element (60). The volumetric space element (60) has a shape of a thoroidal sector with respect to the central axis of the device, wherein a generating cross-section of the volumetric space element (60) is greater or similar to a cross-section of the light source (49) in a longitudinal axial plane and preferably has a square shape. The volumetric image element (180) is registered with the volumetric space element (60).

Apertures of the light source elements of the light source (49) scans in an elementary access duration apertures of the volumetric image element (180). Spatial light beams are yielded through the apertures of the volumetric image element (180).

An aperture (182) of the light source element (42) scans in an elementary access duration an aperture (192) of the volumetric image element, wherein the aperture (192) is employed within the facet (188) of the volumetric space element (60). A spatial light beam is yielded through the aperture (192) of the volumetric image element (180). A ratio between a light intensity of the light beam of the light source element (42) and a light intensity of the spatial light beam of the aperture (192) of the volumetric image element (180) is preferably equal or similar to a ratio between an area of the aperture (192) of the volumetric image element (180) and an area of the aperture (182) of the light source element (42).

Figure 12:
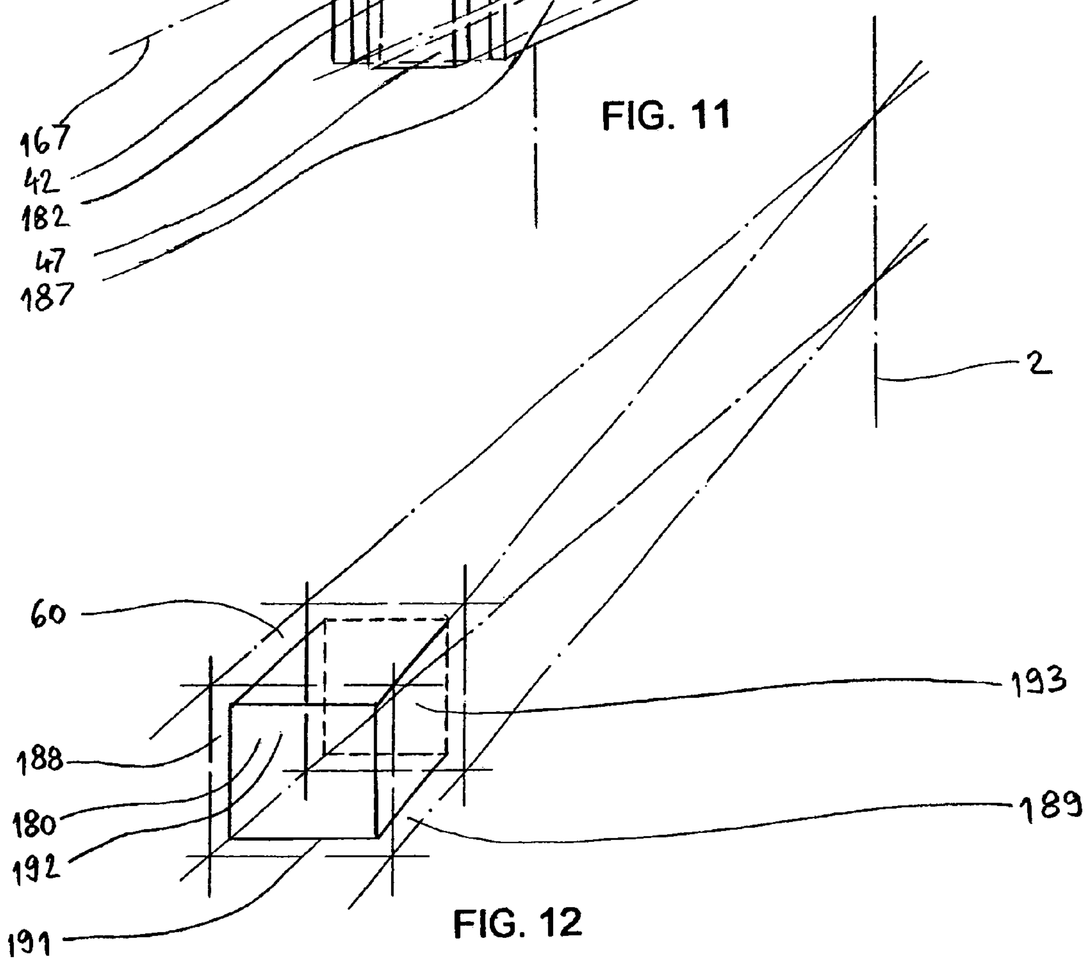
FIG. 12 is a sectional view of a volumetric image element generated by the light source of FIG. 11 and registered within a volumetric space element.

Similarly, an aperture (183) of the light source element (43) scans in an elementary access duration an aperture (193) of the volumetric image element, wherein the aperture (193) is employed within the facet (189) of the volumetric space element (60) as shown in FIG. 12. A light intensity of the light beam of the light source element (43) is preferably equal or similar to a light intensity of the spatial light beam of the aperture (193) of the volumetric image element (180).

The spatial light beams of different facets of the volumetric image element have preferably an equal or similar light intensity. More particularly, a ratio between a light intensity of the light beam of the light source element (42) and a light intensity of the light beam of the light source element (43) is preferably proportional to a ratio between a size of the aperture (183) of the light source element (43) and a size of the aperture (182) of the light source element (42). A light intensity of the light beam of the light source elements (42), (45), (46) and (47) are proportional to an arc length (191) of the volumetric image element (180).

Figure 14:
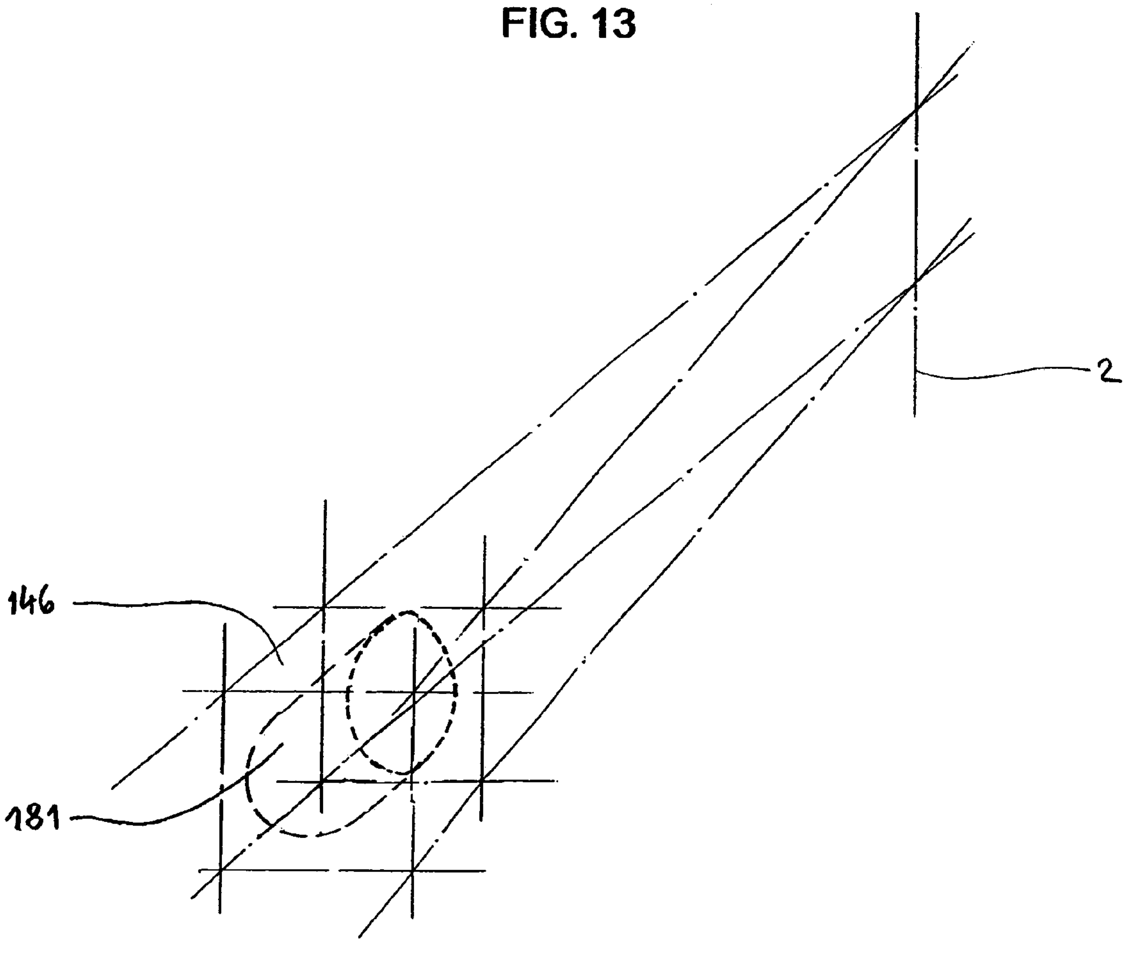
FIG. 14 is a sectional view of a volumetric image element generated by the light source of FIG. 13 and registered within a volumetric space element.

Alternately, the light sources are implemented with individual light generating devices, such as, but not limited to, super-enhanced light-emitting diodes. A super-enhanced light-emitting diode (96) has a light-emitting junction, a reflector, a base (242), a lens (233) and terminals, as shown in FIG. 13. The light source (96) scans in an elementary access duration a volumetric image element (181), as shown in FIG. 14. A light beam is generated by the light source (96) in an elementary access duration, wherein a volumetric image element (181) is employed within the volumetric space element (146). The volumetric image element (181) is registered with the volumetric space element (146).

Figure 15:
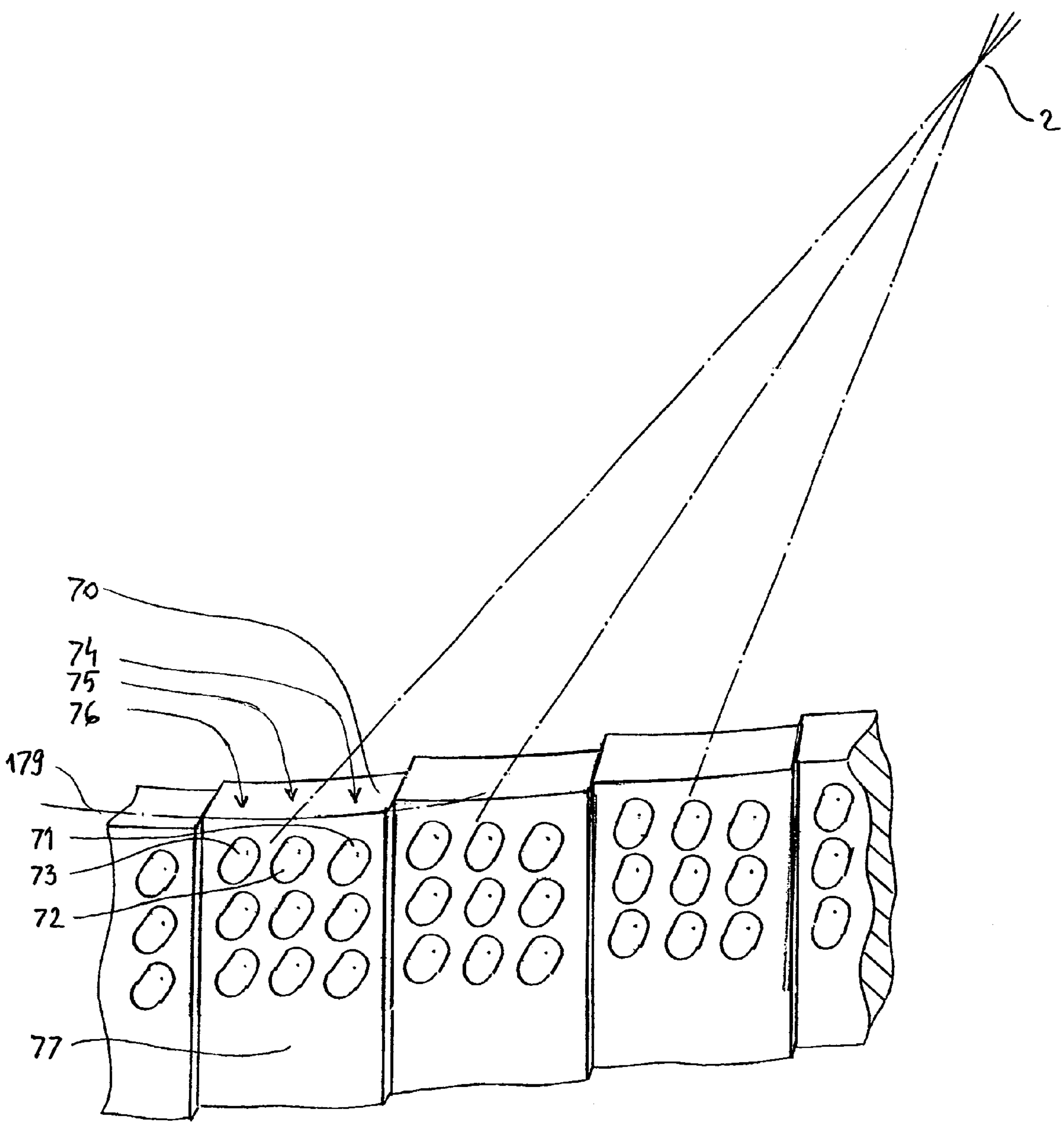
FIG. 15 is a partial view of another alternate generator frame of the device.
Figure 16:
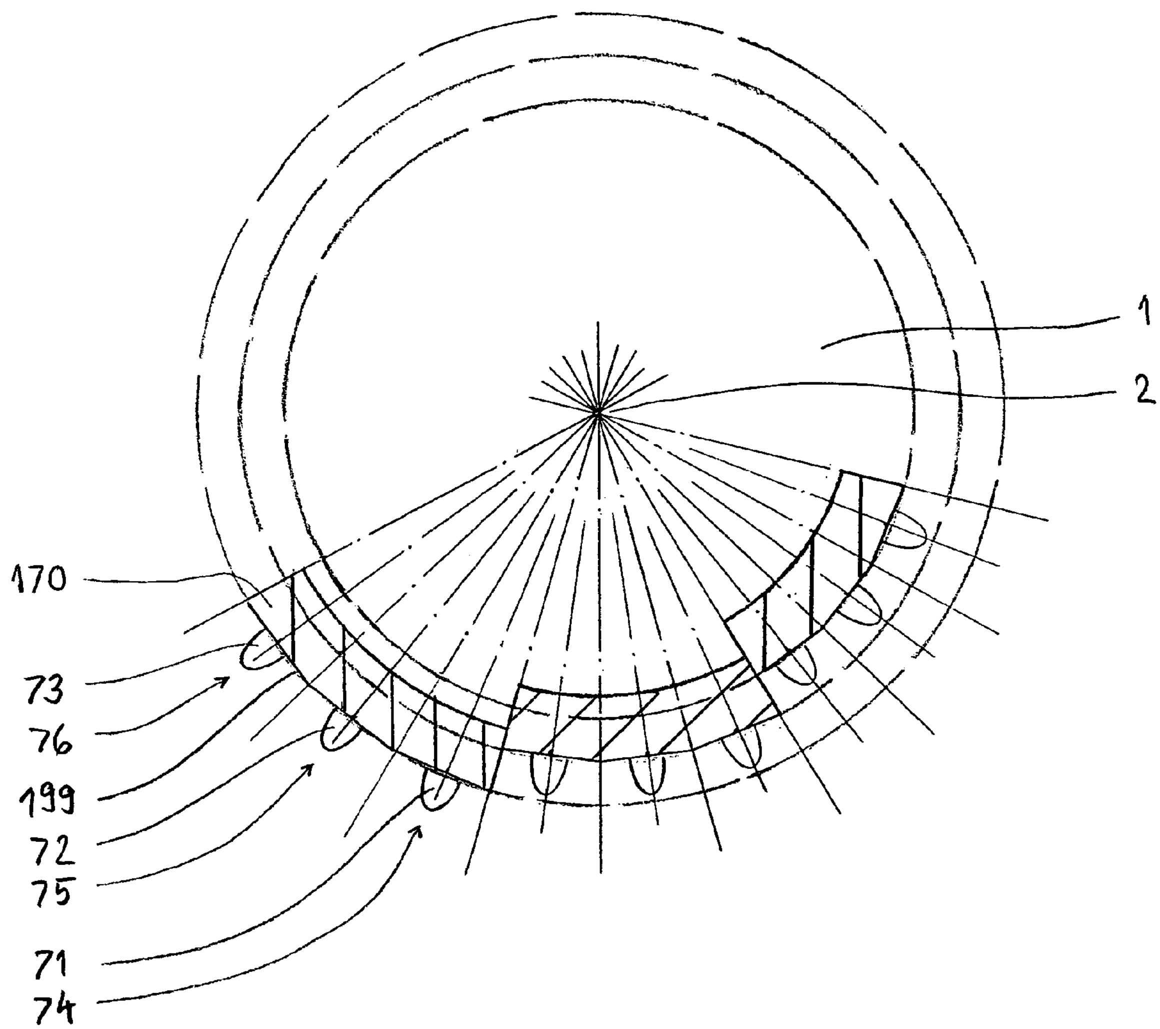
FIG. 16 is a cross-sectional view of the generator frame of FIG. 15.
Figure 17:
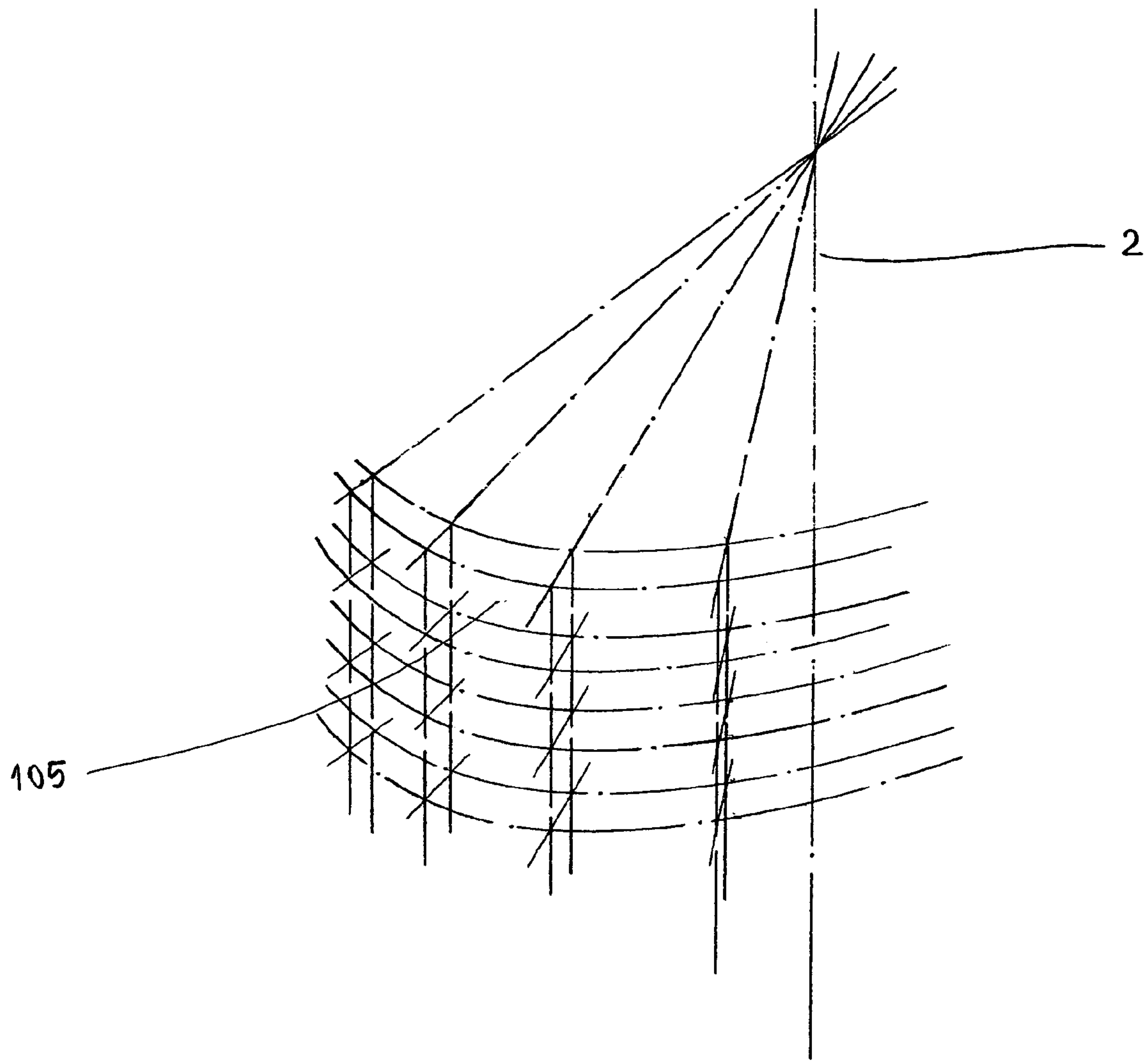
FIG. 17 is a partial sectional view of a volumetric image space, showing a volumetric image element employed by the generator frame of FIG. 15.

Alternately, at least two columns (74) and (75) of light sources are coupled to each of the generator elements (70), as shown in FIG. 15. The columns (74), (75) and (76) of light sources are located at a same distance from the central axis of the device in a transversal plane. Light sources in one column can be monochromatic and provide one primary color in a color space such as RGB color space. An intersection of an exterior facet (77) of the generator element (70) with a transversal plane is a non-linear curve (179). The non-linear curve (179) is preferably an arc of circle. Alternately, an exterior facet of a generator element (170) is composed of a plurality of planar facets, wherein an intersection of the exterior facet of the generator element with a transversal plane is a polygonal curve (199), as shown in FIG. 16. Each of the three columns (74), (75) and (76) of light sources is deposited on a planar facet, wherein the light sources (71), (72) and (73) of the three columns of light sources are located at a same distance from the central axis of the device in a transversal plane. The light beams of the three light sources (71), (72) and (73) residing in a same transversal plane scan a same volumetric space element (105), as shown in FIG. 17. The light source emitters of the three light sources (71), (72) and (73) are located at a same distance from the central axis and scan a same volumetric image element.

The three light sources are triggered with different phases or delays about a time reference, such that all three light sources generate light at a same spatial coordinate point in the volumetric space. The light sources rotate around the central axis preferably counter-clockwise, such that the image space is scanned from the left side to the right side of the device as viewed from an exterior point of observation. The light source (71) scans firstly a spatial point and is triggered in advance of a time reference of the spatial point, the light source (72) scans secondly the same spatial point and is triggered synchronously with the time reference of the spatial point, and the light source (73) scans lastly the spatial point and is triggered with a delay about the time reference of the spatial point, wherein the delay interval is equal to the advance interval. The delay and advance intervals are derived from an angular span between light sources, a radius of the light sources and the speed of rotation. An arc length of a volumetric image element is derived from an elementary access duration of light sources, a radius of the light sources and the speed of rotation. Practically, the electronic circuitry which drives the light sources can generate an electrical signal for the light source (71) in phase to an advanced time reference of the spatial point, secondly generates a second electrical signal for the light source (72) delayed from the first electrical signal, and lastly generates a third electrical signal for the light source (73) delayed from the second electrical signal, wherein the advanced time reference is in advance of the actual time reference of the spatial point. Alternately, the electrical signals which trigger the light sources can be generated in a synchronous manner, wherein the delay of each electrical signal is independently adjustable. In the case when a pseudo-uniform discrete volumetric space from center to extremities is employed, the delay and advance intervals with which the light sources are triggered are variable from a vicinity of the central axis to extremities of the volumetric space and are adjusted independently for each column of light sources. The electrical signals with independently-adjustable delays can be generated in an analog or digital approach. In a digital approach, the electrical signals are derived from one or more high-frequency clock signals.

The light sources coupled to or deposited on a generator frame form a screen frame (190). A complete rotation of the screen frame around the central axis of the device forms a volume frame. It is desirable to use a refresh rate of the volumetric space of at least 30 volume frames/s.

The light sources are preferably, but not limited to, individual light sources, light emitting diodes or LEDs, super-enhanced light emitting diodes, linear arrays of light emitting elements, matrix LEDs, continuous-spectrum LEDs, volumetric LED arrays, linear liquid crystal displays, liquid crystal displays, laser diodes and the like.

For a monochromatic representation, such as black-and-white, at least one screen frame is needed. More than one screen frames can be used to decrease the speed of rotation of the device. For color representation, individual color light sources, such as, but not limited to, super-enhanced LEDs or thin-film laser diodes, are used to employ three color layers of light sources, one for each primary color in a color space such as RGB color space. The color layers are coupled to or deposited on a single generator frame or on three separate generator frames. If continuous-spectrum LEDs or linear arrays of continuous-spectrum LEDs are used, then one generator frame is needed, since each light source in the layer can generate any color in a color space depending on its input.

Figure 18:
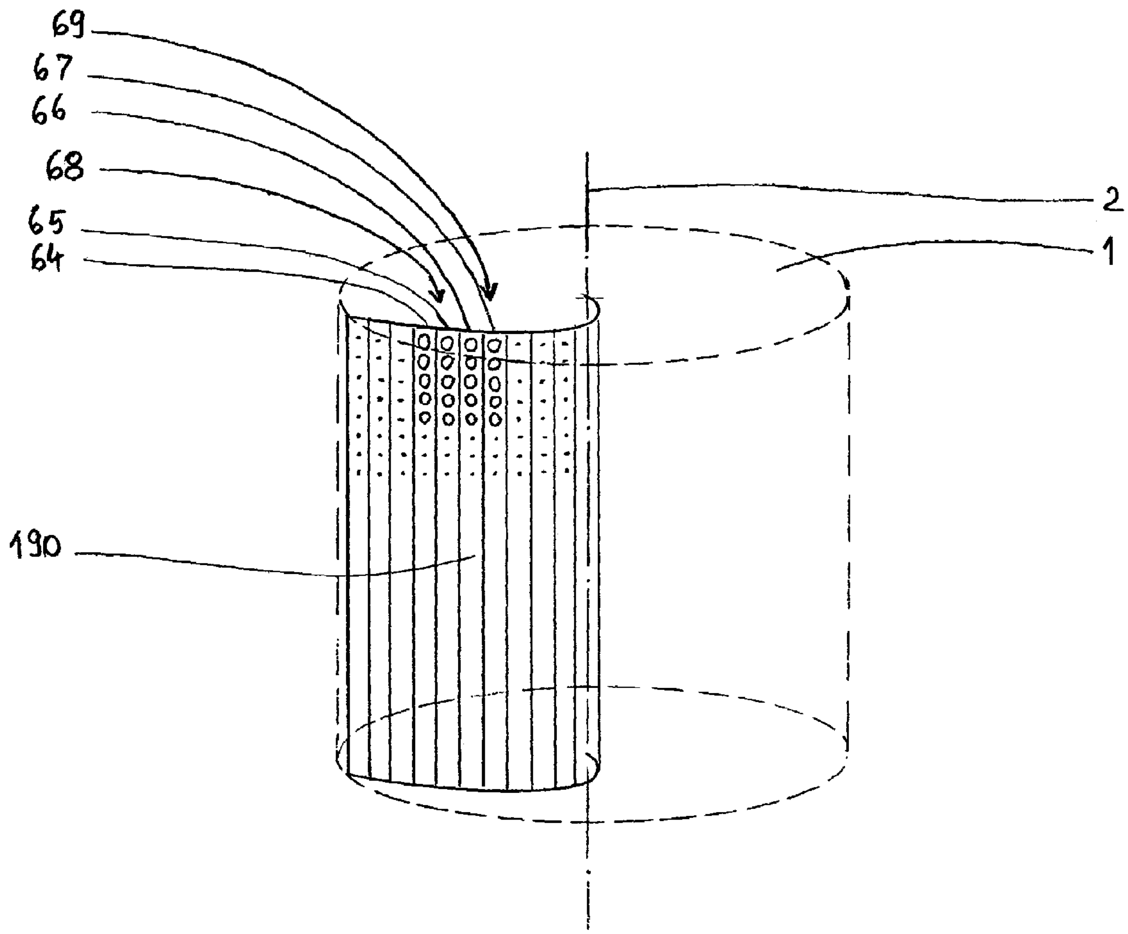
FIG. 18 is a partial sectional view of a generator frame in the volumetric space showing column partitions.

The device according to the present invention further comprises at least two column partitions (68) and (69) of light sources residing in longitudinal directions with respect to the central axis of the device, wherein each of the column partition of light sources is composed of at least two columns of light sources (64) and (65), and (66) and (67), respectively, as shown in FIG. 18. The light sources located in adjacent column partitions have unequal elementary access durations and the light sources located in a same column partition have equal elementary access durations. More particularly, the elementary access duration of the light sources located in one of the column partitions is constant. The elementary access duration of the light sources located in one column partition (69) is smaller than the elementary access duration of light sources located in an adjacent column partition (68) in a direction toward the central axis (2) of the device.

The generator elements have preferably an elongated shape in a longitudinal direction with respect to the central axis of the device. The generator elements rotate around the central axis and are preferably transparent. The generator elements are coupled to positioning means which rotate around the central axis of the device and are preferably transparent. The positioning means can have an oval, circular or irregular shape, wherein the positioning means counter-balance the generator elements for dynamic moments and forces with respect to the central axis of the device.

The device is further composed of a device driving module (78) which periodically and individually accesses each of the light sources for an elementary access duration. An intensity and a color of the light beams generated by the light sources are controlled by the device driving module. The device driving module rotates around the central axis of the device synchronously with the light sources and drives the light sources synchronously in relation to a spatial reference or a temporal reference. The device driving module (78) receives the data stream of a discrete volumetric image and drives the light sources according to the image data. The device driving module preferably has a memory function. The device driving module is composed at least of electronic circuitry which reside on one or more printed-circuit boards (79) and is contained in a rotating platform (86). A light separator, such as a cover, not shown, can be used between the rotating platform and the volumetric space (1) to mask the electronic circuitry. A portion of the electronic circuitry of the device driving module can reside on the generator elements.

The light sources are preferably connected to the device driving module through conducting means, not shown, which extend along the generator elements. The conducting means are preferably transparent and implemented as thin-film electrodes. Elementary image signals which drive the light sources are converted from digital to analog levels by the device driving module.

The device is further composed of an image processing system (84) which generates, receives, transmits, processes or stores the data content of a volumetric image, translates the data content according to a spatial coordinate system compatible with the device driving module and transfers the data content to the device driving module. The image processing system is preferably enclosed in a base (86) of the device, such that the volumetric device is a standalone self-contained unit. Alternately, the image processing system can be an external computing system or the like. The image processing system is stationary with respect to the base (86). Image data in a coordinate system, such as, but not limited to, mixed polar-carthesian coordinate system, is transferred from the image processing system (84) to the device driving module (78).

The image processing system (84) is coupled to the device driving module (78) through at least one optical coupling module (80). The optical coupling module is composed of at least one light generating device (88) and of at least one light detection device (90), as shown in FIG. 19. The light generating device (88) is coupled to the image processing system and is stationary with respect to the base of the device. The light detection device (90) is coupled to the device driving module and rotates around the central axis together with the rotating platform and the light sources. The movable components of the optical coupling module (80) can be implemented on one of the printed-circuit boards (79).

The light generating device employs optical transmitters, such as, but not limited to, lasers, light emitting diodes and laser diodes. The light detection device employs optical receivers, such as, but not limited to, light-detectors and photo-detectors. The optical coupling module (80) can include fiber optics as well.

A direction of light beam generation of the light generating device (88) has preferably an orientation in a longitudinal axial direction on the central axis. A direction of light beam detection of the light detection device (90) has preferably an orientation in a transversal radial direction. The optical coupling module further has a principal optical axis (100), an aperture (89), a lens (91), and a mirror (92) which reflects the principal optical axis (100) into a secondary optical axis (101). The light generating device is located on the principal optical axis (100) and the light detection device is located on the secondary optical axis (101). The mirror (92) rotates around the central axis. The light beam is reflected by the mirror (92) and spans a spatial region in which the optical detection device (90) is located. The lens (91) is preferably a collimating lens.

Figure 20:
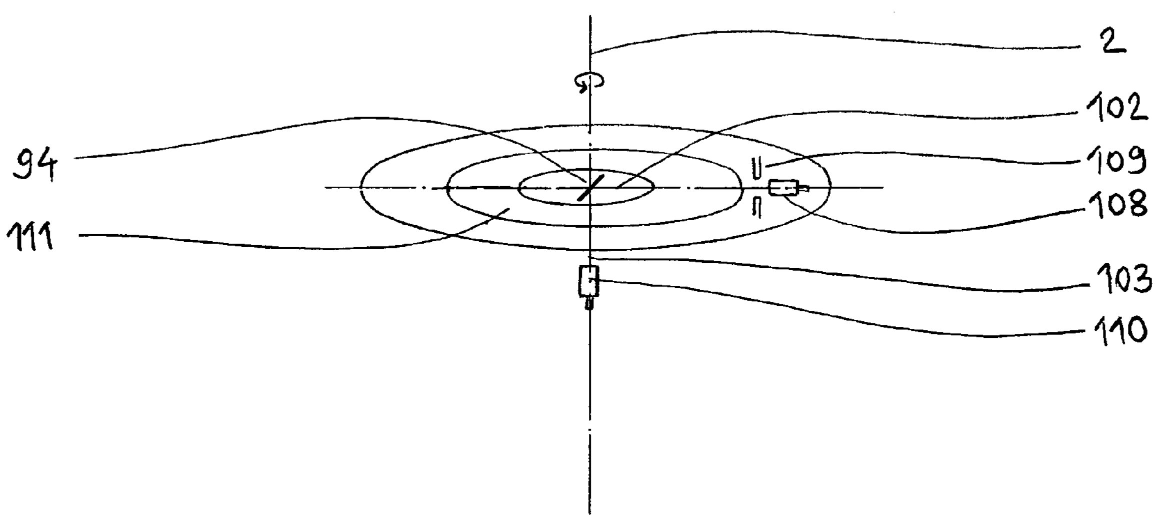
FIG. 20 is a schematic diagram of an optical coupling means.

Alternately, the optical coupling module (80) is composed of at least one light generating device (108) and of at least one light detection device (110), as shown in FIG. 20. The light generating device (108) is coupled to the device driving module and rotates around the central axis together with the light sources. The light detection device (110) is coupled to the image processing system and is stationary with respect to the base (86).

A direction of light beam generation of the light generating device (108) has preferably an orientation in a transversal radial direction on the central axis. A direction of light beam detection of the light detection device (110) has preferably an orientation in a longitudinal axial direction. The optical coupling module further has a principal optical axis (102), an aperture (109), a light guiding means (111), and a mirror (94) which reflects the principal optical axis (102) into a secondary optical axis (103). The light generating device is located on the principal optical axis (102) and the light detection device is located on the secondary optical axis (103). The light guiding means (111) guides the light beam to the mirror (94) and has preferably a circular shape around the central axis. Alternately, the light guiding means is movable and is a light-transmissive parallelipipaedic prism. The mirror (94) rotates around the central axis. The light beam is reflected by the mirror (94) and spans a spatial region in which the optical detection device (110) is located.

The device is further composed of a signal adaptation module (104) which is coupled to the image processing system (84) and to the optical coupling module (80) and which provides signal adaptation. The data transfer is preferably bi-directional in full-duplex mode.

Electrical power is provided to the device driving module residing on the main board by a moving-contact electrical interface. The device can have a rotating axle (81), which rotates around the central axis (2) and to which the positioning means are preferably attached. The action wheel of an electrical motor (82) is placed on the rotating axle between two bearings (83). The volumetric space is contained with an impact-resistant protective shield made of reinforced glass, fiber glass, polycarbonate or the like and it is coated with anti-reflective layers or similar. The contained space can be low-pressured to reduce air friction and can be cooled down as well.

Figure 21:
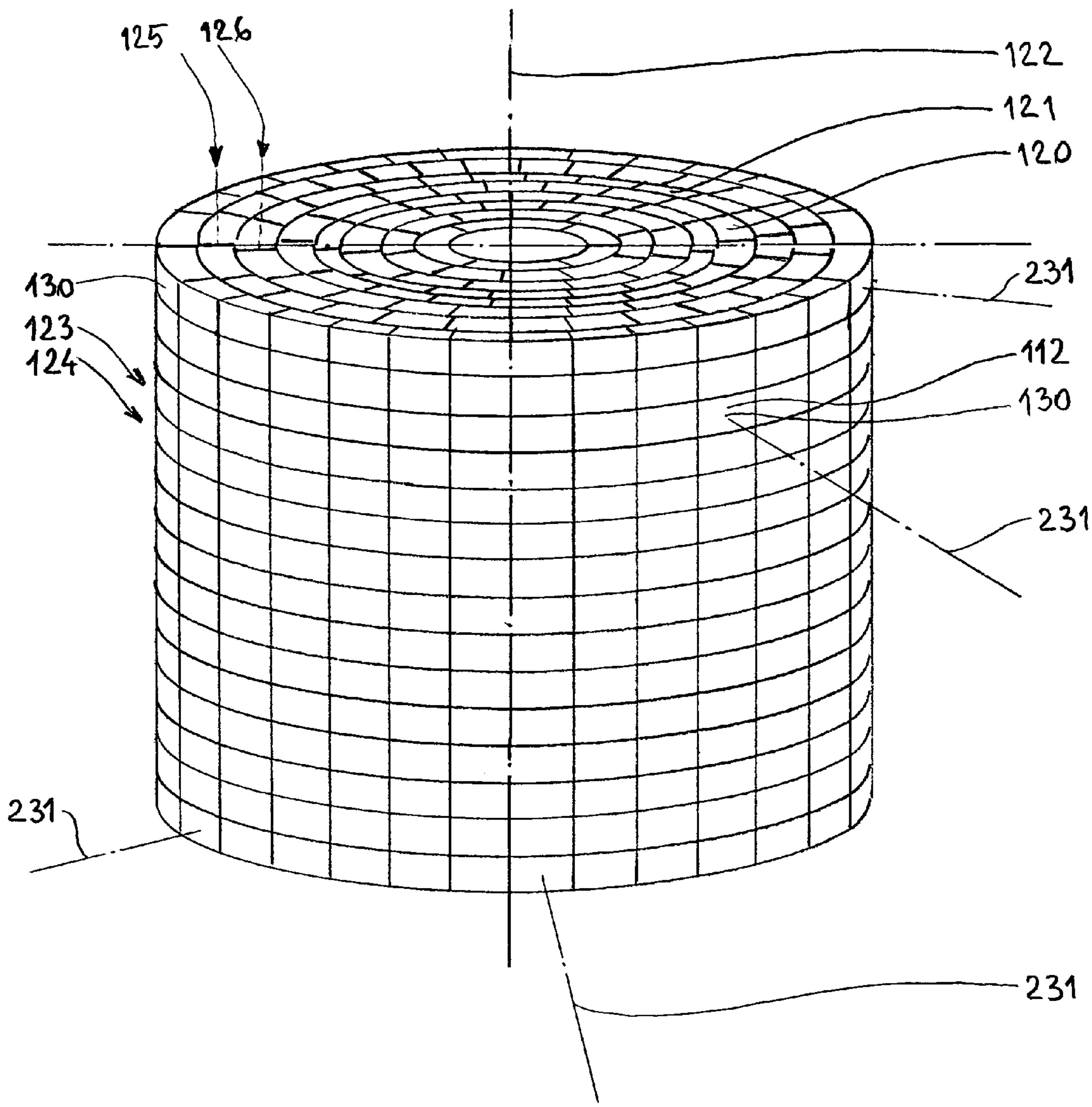
FIG. 21 is a general view of the volumetric image space employed by a method of the present invention, showing voxel distribution and orientation.

The method for volumetric reconstruction of volumetric images according to the present invention includes moving a multitude of light sources around a central axis (122) of a volumetric space (121) and generating periodically a light beam by each of the light sources in an elementary access duration, as shown in FIG. 21. A light beam is generated by a light source from within a volumetric space element, wherein a volumetric image element is employed. The method includes employing a volumetric image space (120) composed of a multitude of volumetric image elements (130) in the volumetric space (121) and scanning each of the volumetric image elements by one or more of the light sources in one or more elementary access durations. The light sources are coupled to a volumetric image element in an elementary access duration. The volumetric space (121) is a discrete space composed of a multitude of volumetric space elements (112), wherein a volumetric image element or voxel (130) is registered with the volumetric space element (112). Volumetric image elements are employed within the volumetric space elements by accessing the light sources in an elementary access duration. The volumetric space elements (112) entirely fill the volumetric space (121).

The method employs at least two surface layers (123) and (124) of volumetric image elements residing in transversal planes with respect to the central axis (122) and at least two volume layers (125) and (126) of volumetric image elements intersecting transversal planes on the central axis (122). The volume layers can be concentric with respect to the central axis. The surface layers (123) and (124) are preferably planar and orthogonal on the central axis. The surface layers extend from a vicinity of the central axis to extremities of the volumetric space. The volume layers (125) and (126) extend from a lower side to an upper side of the volumetric space.

Figure 22:
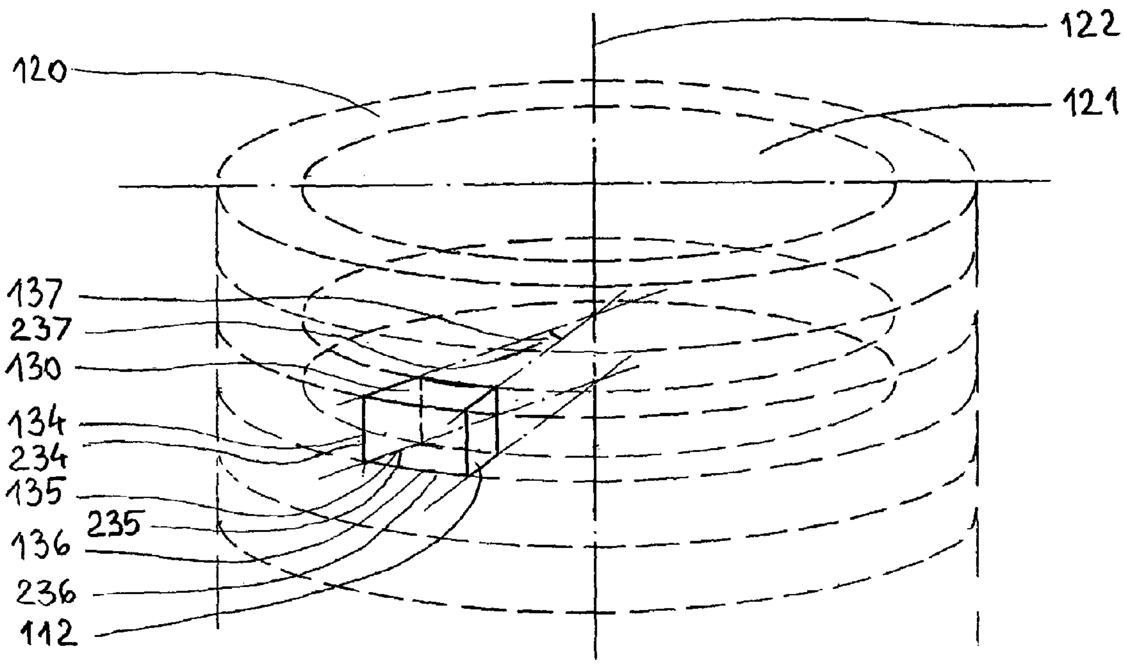
FIG. 22 is a sectional view of the volumetric image space, showing a volumetric image element.

The volumetric image space (120) is composed of a plurality of volumetric image elements (130). Each of the volumetric image elements is scanned during an elementary access duration by one or more light sources which rotate around the central axis. Volumetric image elements (130) have some space characteristics:

a height (134) in a longitudinal plane on the central axis,
a radial dimension (135) in a transversal plane on the central axis,
an arc length (136) in a transversal plane on the central axis,
an angular span (137) with respect to the central axis in a transversal plane on the central axis, as shown in FIG. 22. Similarly, volumetric space elements (112) have:

a height (234) in a longitudinal plane on the central axis,
a radial dimension (235) in a transversal plane on the central axis,
an arc length (236) in a transversal plane on the central axis,
an angular span (237) with respect to the central axis in a transversal plane on the central axis.

The volumetric image space (120) is pseudo-uniform discrete, wherein an arc length of the volumetric image elements is constant from a vicinity of the central axis to extremities of the volumetric image space. The volumetric image elements have at least one aperture having a spatial orientation opposite to the central axis (122) of the volumetric space. A principal optical axis (231) of the volumetric image elements is in a transversal radial direction with respect to the central axis and has a direction which is opposite to a spatial region located in a vicinity of the central axis. The volumetric image elements have an unrestricted field of view of in a transversal radial direction toward extremities of the volumetric space.

Figure 23:
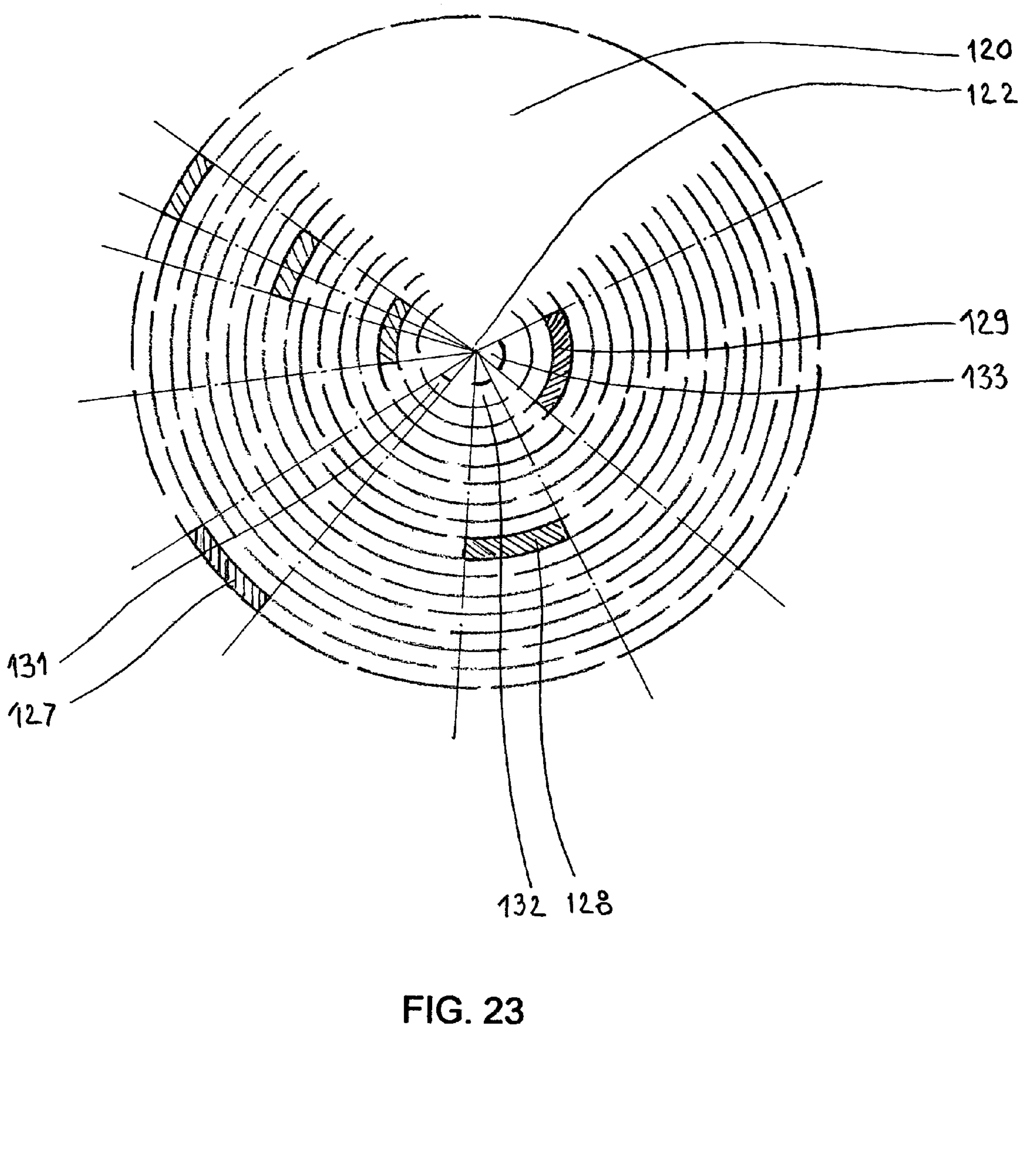
FIG. 23 is a cross-sectional view of the volumetric space employed by a method of the present invention.

An angular span (137) of the volumetric image elements (130) is variable from a vicinity of the central axis (122) to extremities of the volumetric space. More particularly, an angular span of the volumetric image elements is decreasing in a transversal plane from a vicinity of the central axis to extremities of the volumetric space, as shown in FIG. 23. Volumetric image elements (127), (128) and (129) located at different radial distances from the central axis (122) have different angular spans (131), (132) and (133) with respect to the central axis (122).

An angular span of the volumetric image elements can be inverse proportional to a radius of the volumetric image elements to the central axis. An elementary access duration of the light sources is decreasing in a transversal plane from a vicinity of the central axis to extremities of the volumetric space.

An arc length (136) of the volumetric image elements residing in a transversal plane is preferably constant from a vicinity of the central axis to extremities of the volumetric space. Furthermore, an arc length (136) of the volumetric image elements (130) is preferably equal to a height (134) or to a radial dimension (135) of the volumetric image elements. A size of the volumetric space elements (112) is preferably similar to a size of the volumetric image elements (130).

Figure 24:
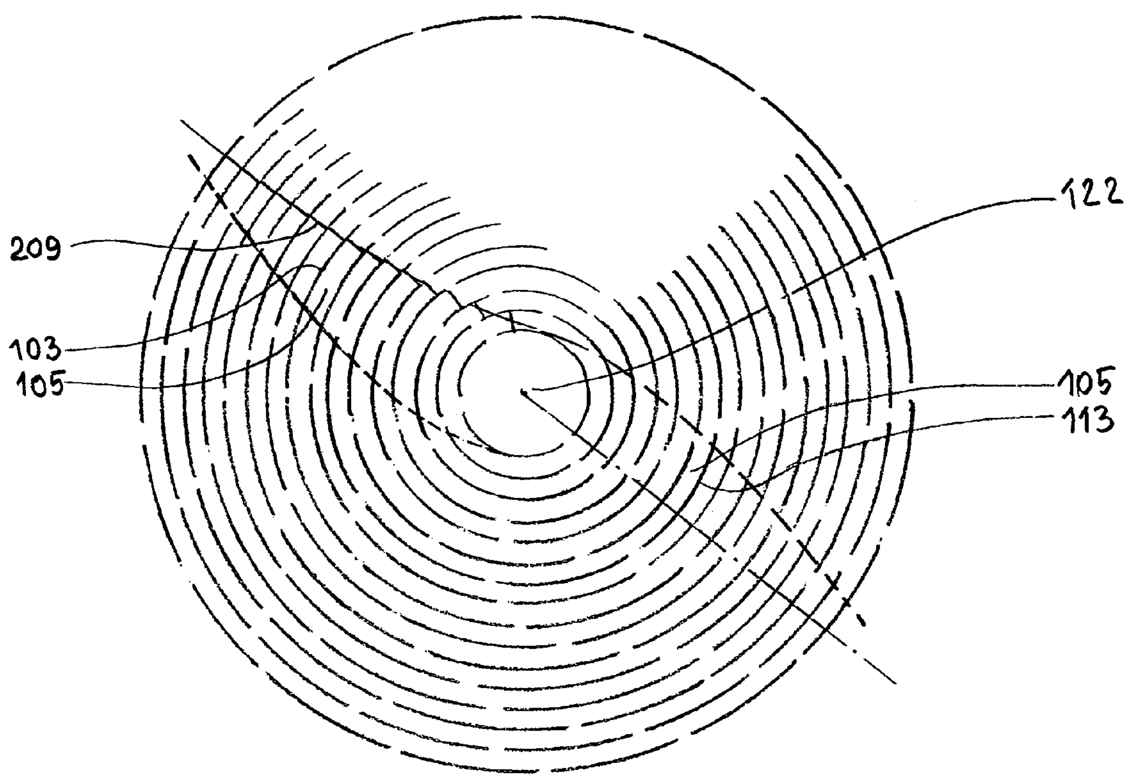
FIG. 24 is a cross-sectional view of the volumetric space employed by a method of the present invention.

Alternately, an arc length (113) of the volumetric image elements (105) is decreasing from a vicinity of the central axis to extremities of the volumetric space, as shown in FIG. 24. A longitudinal axial semi-plane or a radiation line of the generator frame, which is a non-linear curve (209), are used as synchronization lines.

Figure 25:
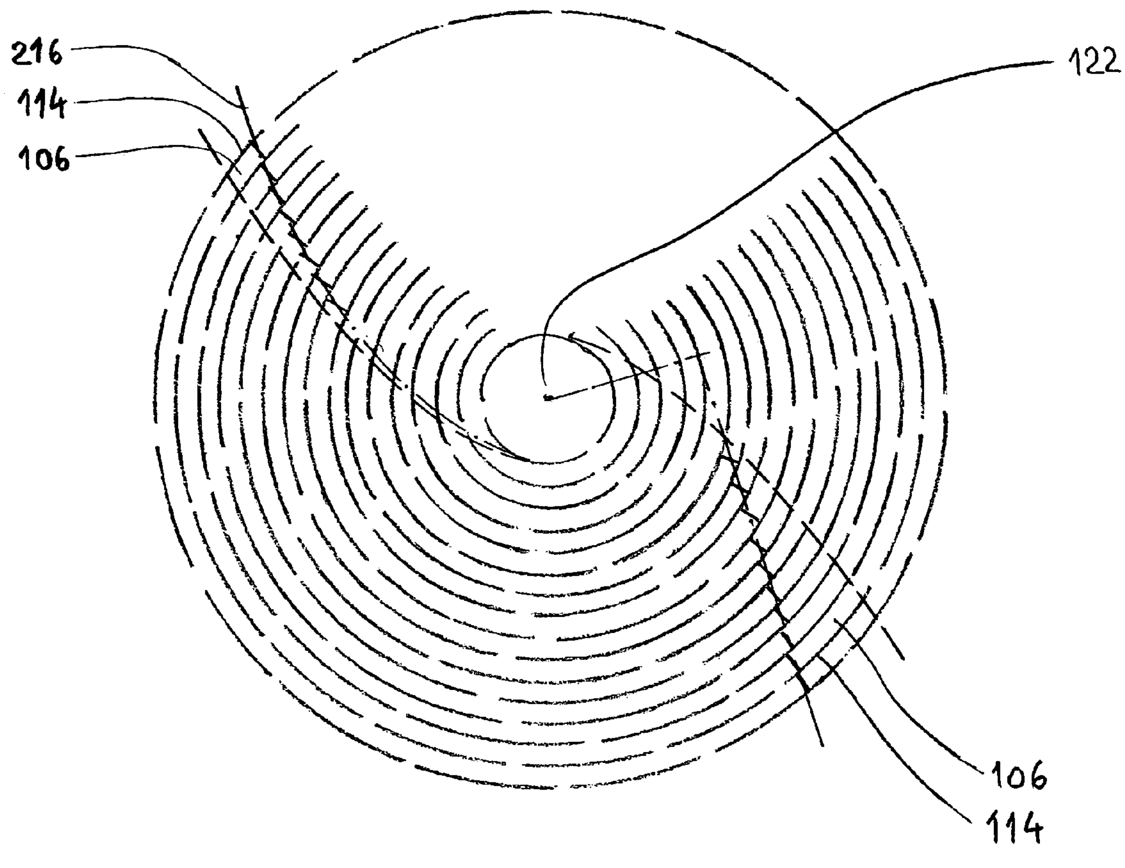
FIG. 25 is a cross-sectional view of the volumetric space employed by a method of the present invention.

Alternately, an arc length (114) of the volumetric image elements (106) is increasing from a vicinity of the central axis to extremities of the volumetric space, as shown in FIG. 25. An angular span of the volumetric image elements is increasing from a vicinity of the central axis to extremities of the volumetric space. A non-linear curve (216) or an arbitrary longitudinal plane (217) are used as synchronization lines.

Figure 26:
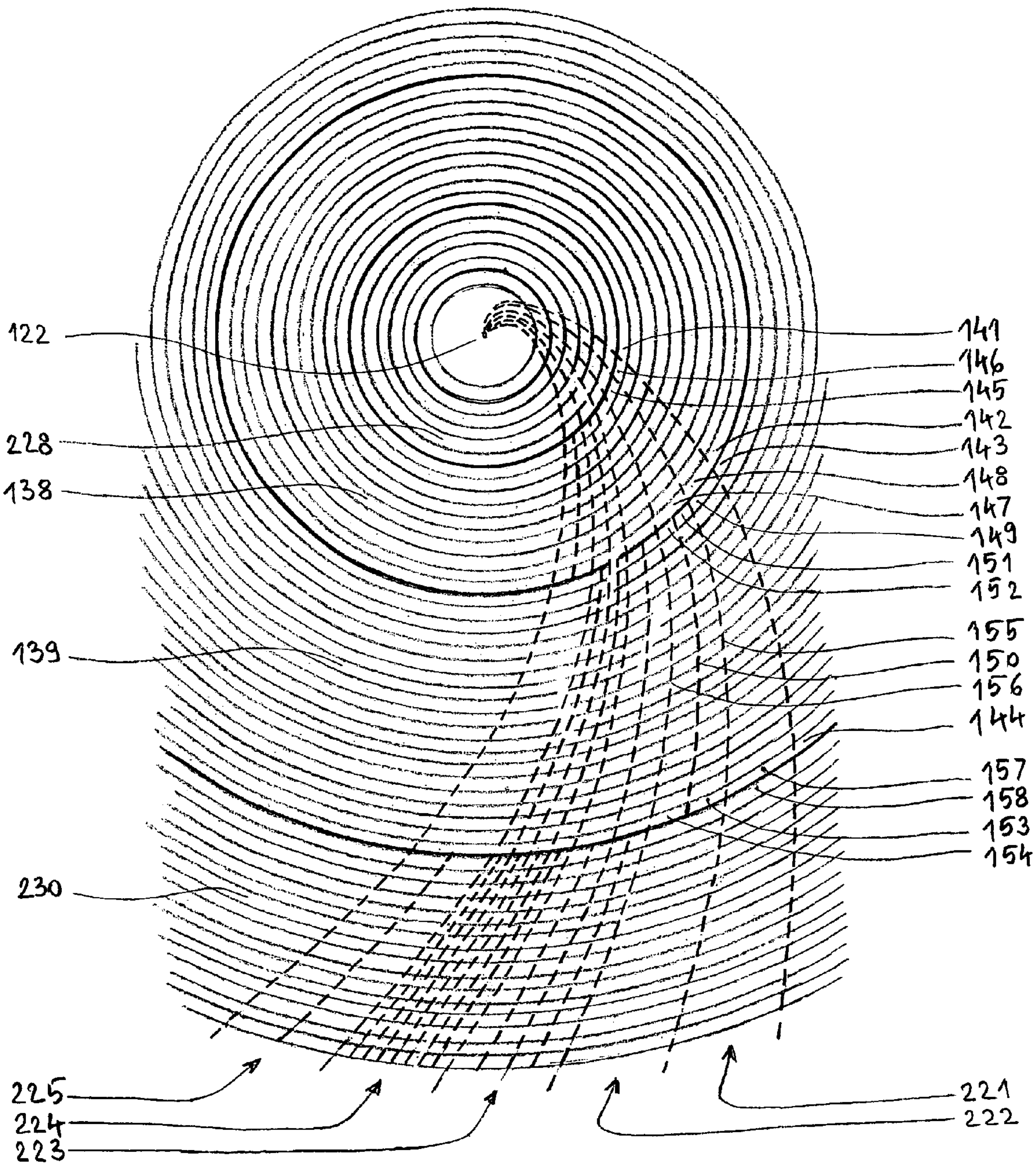
FIG. 26 is a partial cross-sectional view of the volumetrio space employed by a method of the present invention.

The method further employs at least two volume partitions (138) and (139) of volumetric image elements. Each of the volume partitions (138) and (139) is composed of at least two volume layers (141) and (142) and (143) and (144), respectively, of volumetric image elements, as shown in FIG. 26. The volume partitions are preferably concentric with respect to the central axis. An angular span of the volumetric image elements located in one of the volume partitions is constant from a lower radius to an higher radius of the volumetric image elements located in the volume partition. More particularly, angular spans of volumetric image elements (145) and (147) located at extremities of the volume partition (138) are equal.

An arc length of the volumetric image elements located in one of the volume partitions is increasing from a lower radius to a higher radius of the volumetric image elements. More particularly, an arc length of the volumetric image elements located in one of the volume partitions is proportional to a radius of the volumetric image elements.

Volumetric image elements located in adjacent volume partitions have unequal angular spans. An angular span of volumetric image elements located at a lower radius in a higher-radius volume partition (139) is smaller than an angular span of volumetric image elements located at a higher radius in a lower-radius volume partition (138). More particularly, a ratio between an angular span of volumetric image elements (151) and (152) located at a lower radius in the volume partition (139) and an angular span of volumetric image elements (147) and (148) located at a higher radius in the volume partition (138) is between 1:1 to 1:4. An angular span of the volumetric image element (151) and (152) and an angular span of the volumetric image element (145) are preferably equal and a ratio between an angular span of volumetric image elements (151) and (152) and an angular span of volumetric image elements (147) and (149) is preferably 1:2.

Furthermore, an arc length of the volumetric image elements located at a lower radius in one of the volume partitions is smaller than an arc length of the volumetric image elements located at a higher radius in an adjacent lower-radius volume partition in a direction to the central axis of the volumetric image. More particularly, a ratio between an arc length of the volumetric image elements (151) and (152) located at a lower radius in one of the volume partitions and an arc length of the volumetric image elements (147) and (148) located at a higher radius in an adjacent lower-radius volume partition (138) in a direction to the central axis is between 1:1 to 1:4. An arc length of the volumetric image element (151) and (152) and an arc length of the volumetric image element (145) and (146) are preferably equal and a ratio between an arc length of volumetric image elements (151) and (152) located in the volume partition (139) at a lower radius and an arc length of volumetric image elements (147) and (148) located in the volume partition (138) at a higher radius is preferably 1:2.

An angular span between the non-linear curves (155) and (156) is scanned in a first-order elementary access duration which can be used to access the volumetric image elements of the volume partition (138) in a spatial sector (222) of the volumetric image and the volumetric image elements in a spatial sector (221). An angular span between the non-linear curves (155) and (150) is scanned in a second-order elementary access duration which can be used to access the volumetric image elements of the higher-radius volume partition (139) in a spatial sector (222) and the volumetric image elements of the volume partition (138) in a spatial sector (225). A third-order elementary access duration can be used to access the volumetric image elements of the volume partition (139) in a spatial sector (224). A fourth-order elementary access duration can be used to access the volumetric image elements of the volume partition (230) in a spatial sector (224), providing a spatial division which is similar to a spatial division of a lower-radius volume partition (228) and which is eight-times greater than a spatial division of the volumetric image elements of the volume partition (230) in a spatial sector (221).

Alternately, an angular span of the volumetric image elements is constant from a vicinity of the central axis to extremities of the volumetric space. More particularly, the volumetric image elements (146), (148), (149), (157) and (158) have a same angular span. An arc length of the volumetric image elements is increasing from a vicinity of the central axis to extremities of the volumetric space and preferably is proportional to a radius of the volumetric image elements.

The method includes reconstructing of at least one volumetric image within the volumetric image space. The volumetric image is composed of a plurality of volumetric image elements, wherein a volumetric image element is preferably employed within a volumetric space element.

The volumetric image elements which are employed in a same elementary access duration are not residing in a same longitudinal axial semi-plane. Subsequently, volumetric image elements of a same generation are not residing in a same longitudinal axial semi-plane and do not block each-other on an optical path. Additionally, intersections of three or more of the volumetric image elements of a same generation with a transversal plane on the central axis are located on at least one non-linear curve. The non-linear curve extends from a vicinity of the central axis to extremities of the volumetric space and is preferably a spiral, or an arc of circle or ellipse, or an arc of parabola or hyperbola. Further, a principal optical axis of said volumetric image elements is in a transversal radial direction with respect to said central axis, and preferably has a direction which is opposite to a spatial region located in a vicinity of the central axis. The method employs an unrestricted field of view of the volumetric image elements in a transversal radial direction toward extremities of the volumetric space. The method also employs a contiguous field of view of the volumetric image in a transversal radial direction on the central axis. The field of view is contiguous from a vicinity of the central axis to extremities of the volumetric space in a region of a center of the volumetric space and on lateral sides of a center of the volumetric space. The field of view depends on the number of generator frames. In the case of a device having one generator frame, the contiguous field of view extends to 360 degrees. In the case of a device having two generator frames, the contiguous field of view extends to 180 degrees. In the case of a device having three generator frames, the contiguous field of view extends to 120 degrees. In the case of a device having four generator frames, the contiguous field of view extends to 90 degrees. In the case of a device having six generator frames, the contiguous field of view extends to 60 degrees. An observer can walk around and observe the reconstructed volumetric image in the same manner in which the observer would walk around and observe a real object. Two observers located at different observation points around the reconstructed volumetric image would see different views of a same volumetric image.

Figure 27:
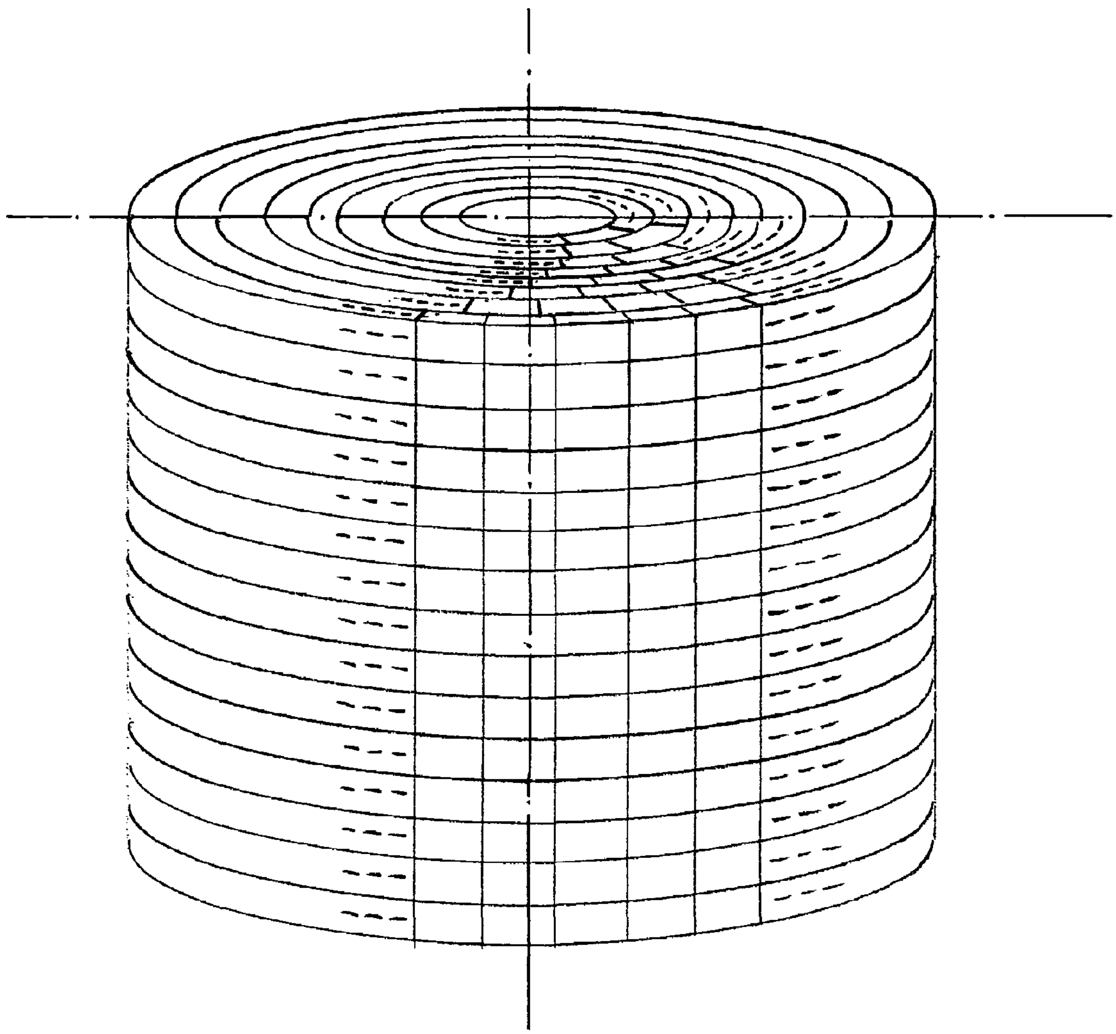
FIG. 27 is a general view of the volumetric image space employed by a method of the present invention, showing a synchronization line.

The method reconstructs at least one volumetric image. The device driving module receives a synchronization signal in relation to a spatial or temporal reference and the reconstructed volumetric image is synchronized by the device driving module in relation to a spatial reference or a temporal reference. The device driving module preferably uses the spatial or temporal reference signal in a phase-locked loop circuitry to generate one or more frame synchronization signals and one or more column synchronization signals. A synchronization surface is a longitudinal section through the volumetric image and is preferably a longitudinal axial semi-plane. Alternately, the synchronization surface is a non-planar surface, as shown in FIG. 27. Furthermore, the volumetric space elements of different volume layers are accessed independently and with different elementary access durations, wherein the synchronization surface and other features of the present invention can be changed or reconfigured without interruption of operation.

The method can employ as well at least one planar or non-planar image reconstructed on a planar or non-planar surface in the volumetric image space. The method can also employ a visual pointer operating in three coordinates in the volumetric image space.

Figure 28:
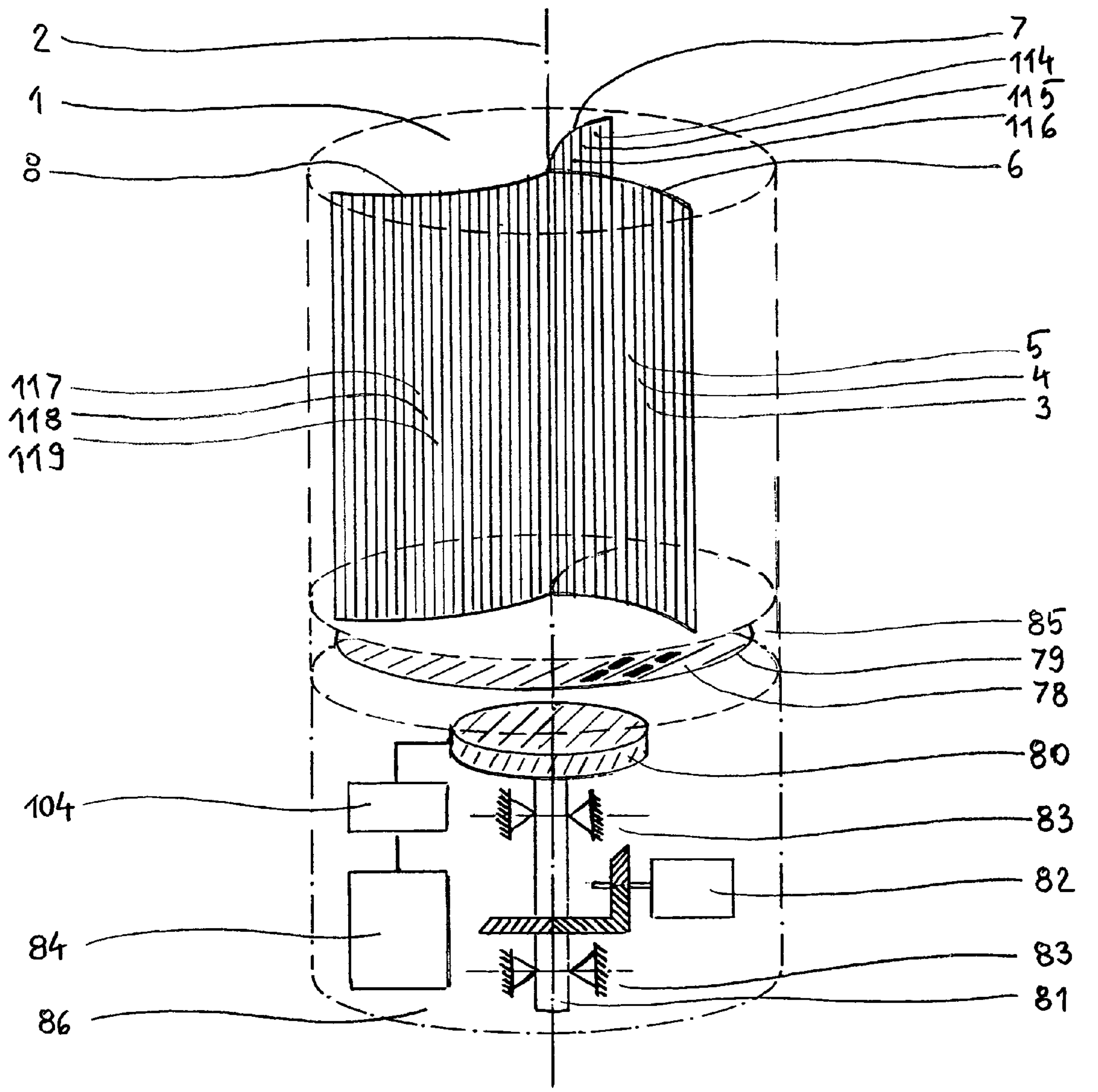
FIG. 28 is a general view of a device according to an alternate embodiment.

In an alternate embodiment of the present invention, a plurality of generator elements are positioned without a distance therebetween and employ at least two contiguous generator frames (6) and (7), as shown in FIG. 28. Each of the generator frames (6), (7) and (8) is composed of at least two generator elements (3) and (4), (114) and (115), and (117) and (118), respectively, located at different distances from a central axis of the device. The generator elements employing a same generator frame are not residing in a same longitudinal axial semi-plane on the central axis (2). A plurality of light sources are coupled to the generator elements. The light sources coupled to a same generator frame are not residing in a same longitudinal axial semi-plane.

Figure 29:
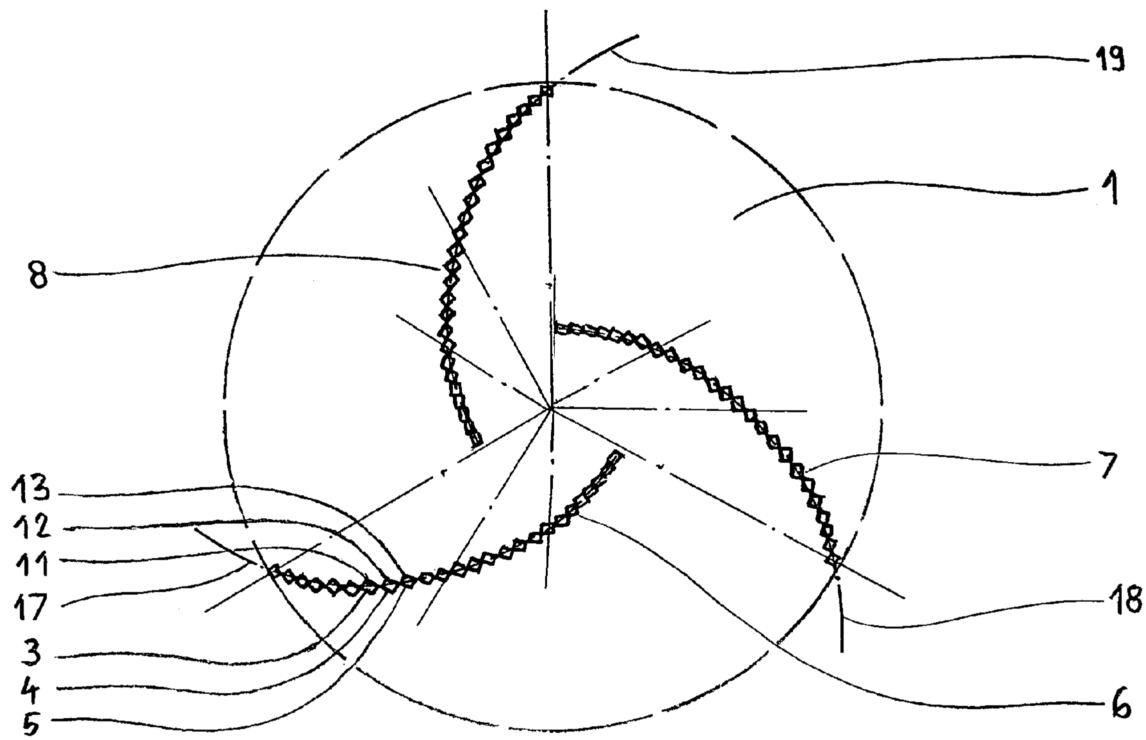
FIG. 29 is a cross-sectional view of the generator frames of the device shown in FIG. 28.

Cross-sections (11), (12) and (13) of three generator elements (3), (4) and (5), respectively, in a transversal plane on the central axis are located on a non-linear curve (17) which extends from a vicinity of the central axis to extremities of the device, as shown in FIG. 29. Similarly, cross-sections in a transversal plane of the generator elements residing in the generator frames (7) and (8) are located on non-linear curves (18) and (19), respectively. The non-linear curves (17), (18) and (19) can intersect the central axis. Each of the generator elements (3), (4) and (5) has an exterior facet which is preferably opposite to the central axis of the device. A generator frame (6) is composed of the generator elements and an exterior facet of the generator frame (6) is composed of exterior facets of the generator elements. A generator frame has preferably a field of view of 120 degrees.

For a color representation using individual light-generating devices, the device is composed of three generator frames, wherein light sources having a primary color in a color space are preferably coupled to a same generator frame. The three light sources are spanned 120 degrees apart around the central axis and are triggered with a same phase or delay about a frame synchronization reference.

Figure 30:
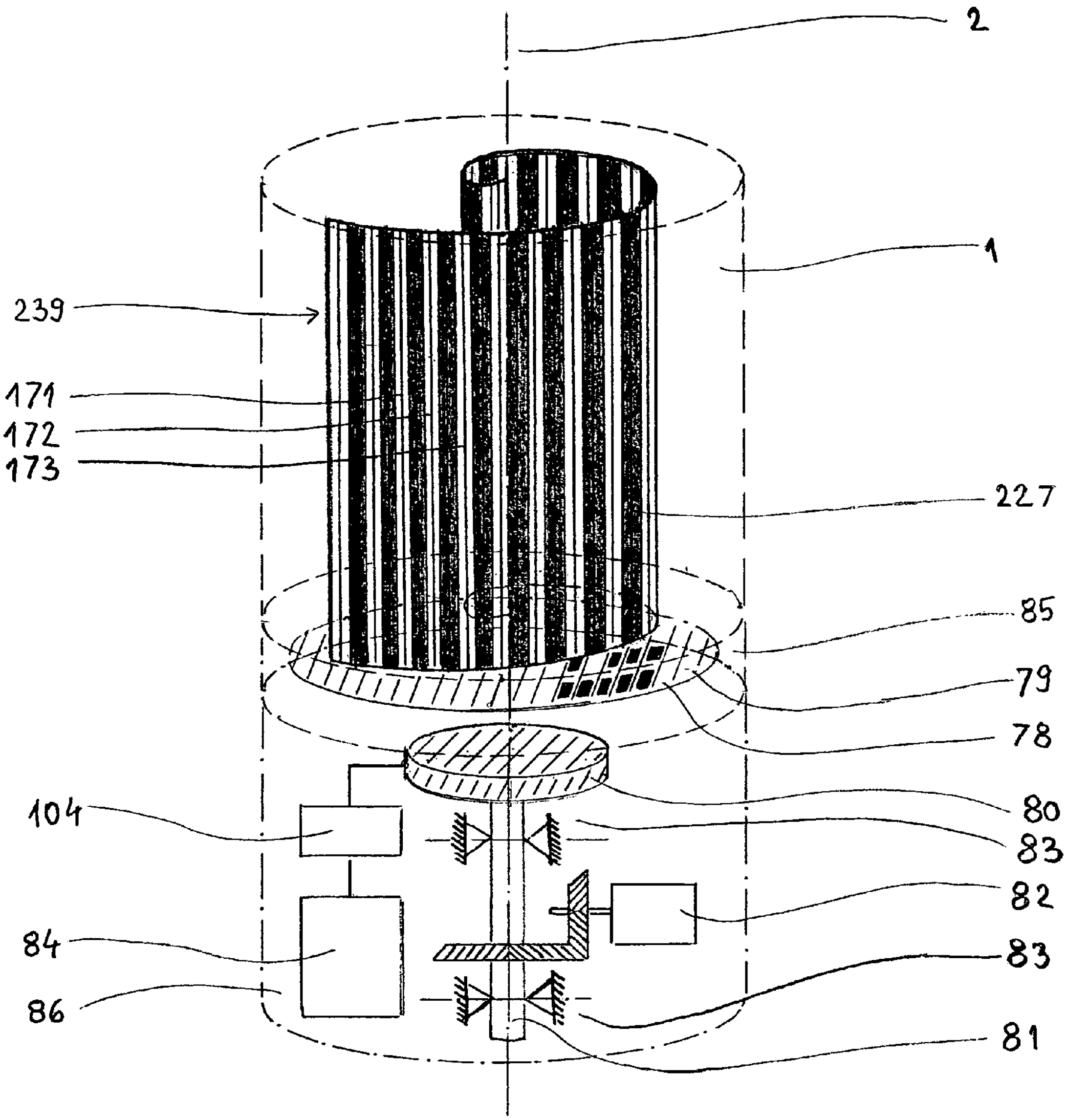
FIG. 30 is a general view of a device according to another alternate embodiment.

In another alternate embodiment of the present invention, at least two generator elements (171) and (172) are located at different distances from a central axis (2) and are positioned with a distance therebetween, as shown in FIG. 30.

Figure 31:
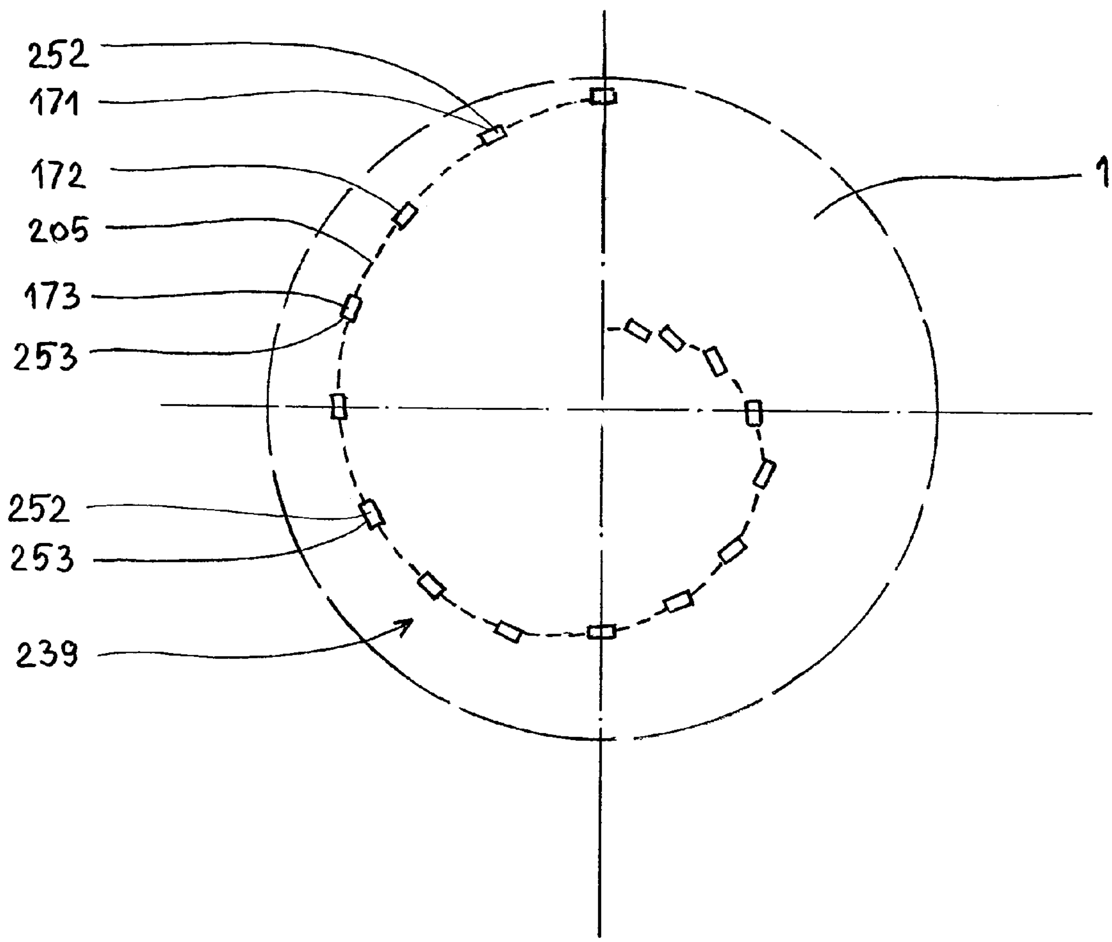
FIG. 31 is a cross-sectional view of the generator frames of the device shown in FIG. 30.
Figure 32:
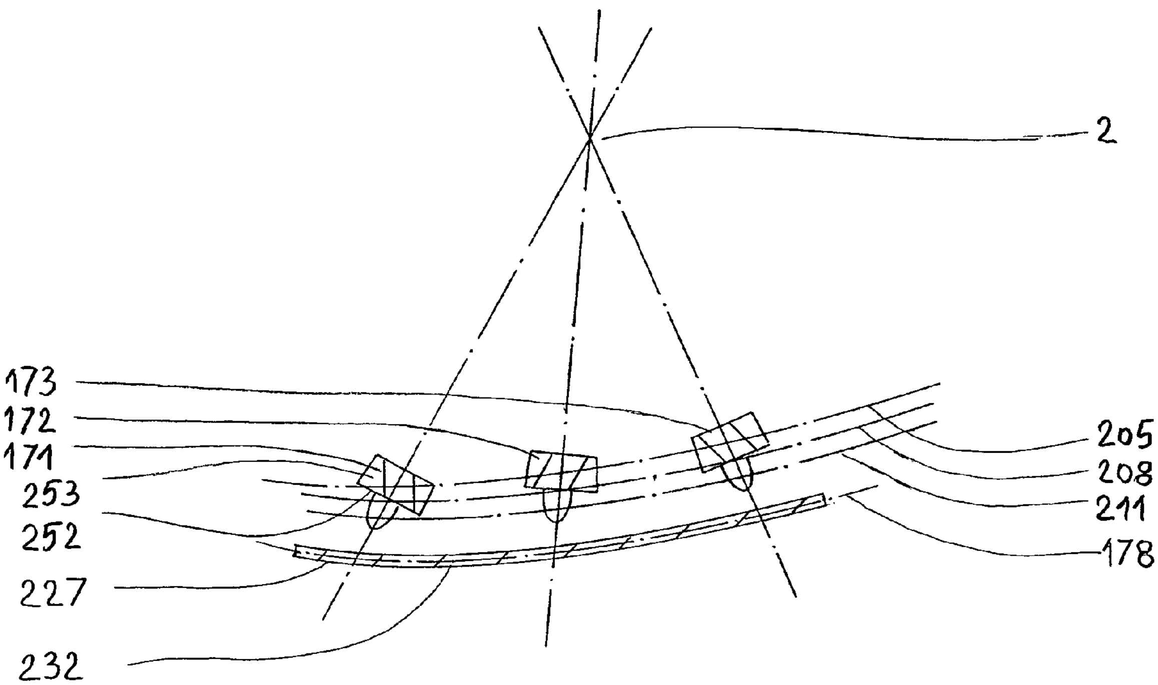
FIG. 32 is a cross-sectional detailed view of the generator frame shown in FIG. 31, showing light sources and light blocking means.

Cross-sections (253) of the generator elements (171), (172) and (173) with a transversal plane are located on a non-linear curve (205), as shown in FIG. 31. A generator frame (239) is composed of the generator elements and has a contiguous field of view of 360 degrees. Each of the generator elements has preferably an exterior facet (252) opposite to the central axis of the device and intersections of exterior facets of the generator elements with a transversal plane are located on a non-linear curve (208), as shown in FIG. 32. A multitude of light sources are coupled to the generator elements and intersections of light source emitters of the light sources are located on a non-linear curve (211).

Figure 33:
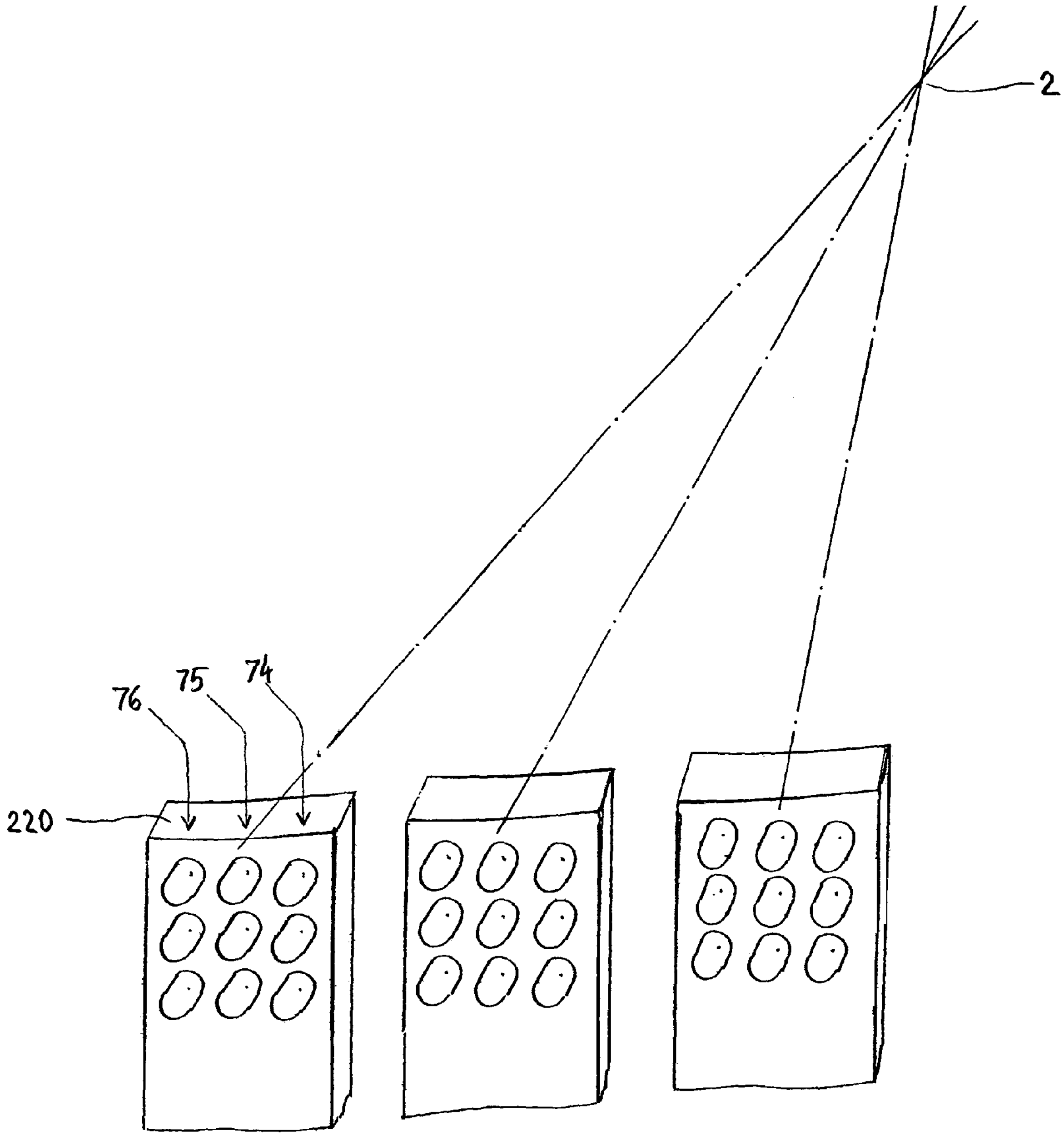
FIG. 33 is a partial view of another alternate generator frame of the device.

Three columns (74), (75) and (76) of light sources can be coupled to each of the generator elements (220), as shown in FIG. 33. Light sources in one column can provide one primary color in a color space. The columns of light sources are located at a same distance from the central axis.

Light blocking means (227), such as, but not limited to, controllable shutters or micro-lenses, liquid crystal displays, liquid crystal diffractive light valves or laser filter cells, are located in front of the light sources with respect to the central axis, wherein the light blocking means and the light sources reside preferably in a same longitudinal axial plane. Alternately, the light blocking means can be deposited as a contiguous thin-film liquid crystal light valve on a non-planar surface which follows the non-linear curve of the radiation line of the generator frame. A cross-section (232) of the light blocking means with a transversal plane is located on a non-linear curve (178). The light blocking means filters or transmits the light beams generated by the light sources, controlling an intensity and an axes of propagation of the light beams generated by the light sources in an elementary access duration. Alternately, the light blocking means receives a light beam generated by the light sources in an elementary access duration and generates at least two secondary light beams having different secondary axes light beam propagation and controls an intensity of secondary light beams. Back light blocking means, such as, but not limited to, controllable shutters or curtains, liquid crystal displays or light valves, can be used between or behind the light sources to control the angle of spread of light beams generated by the light sources or to prevent the light sources to be visible from the opposite semi-space of the volumetric space.

Sixteen generator elements are shown being located around the central axis with an angular opening of 22.5 degrees therebetween, yielding a radial definition of the device of sixteen layers. Although only sixteen generator elements are shown, this should not limit the scope of the present invention.

Figure 34:
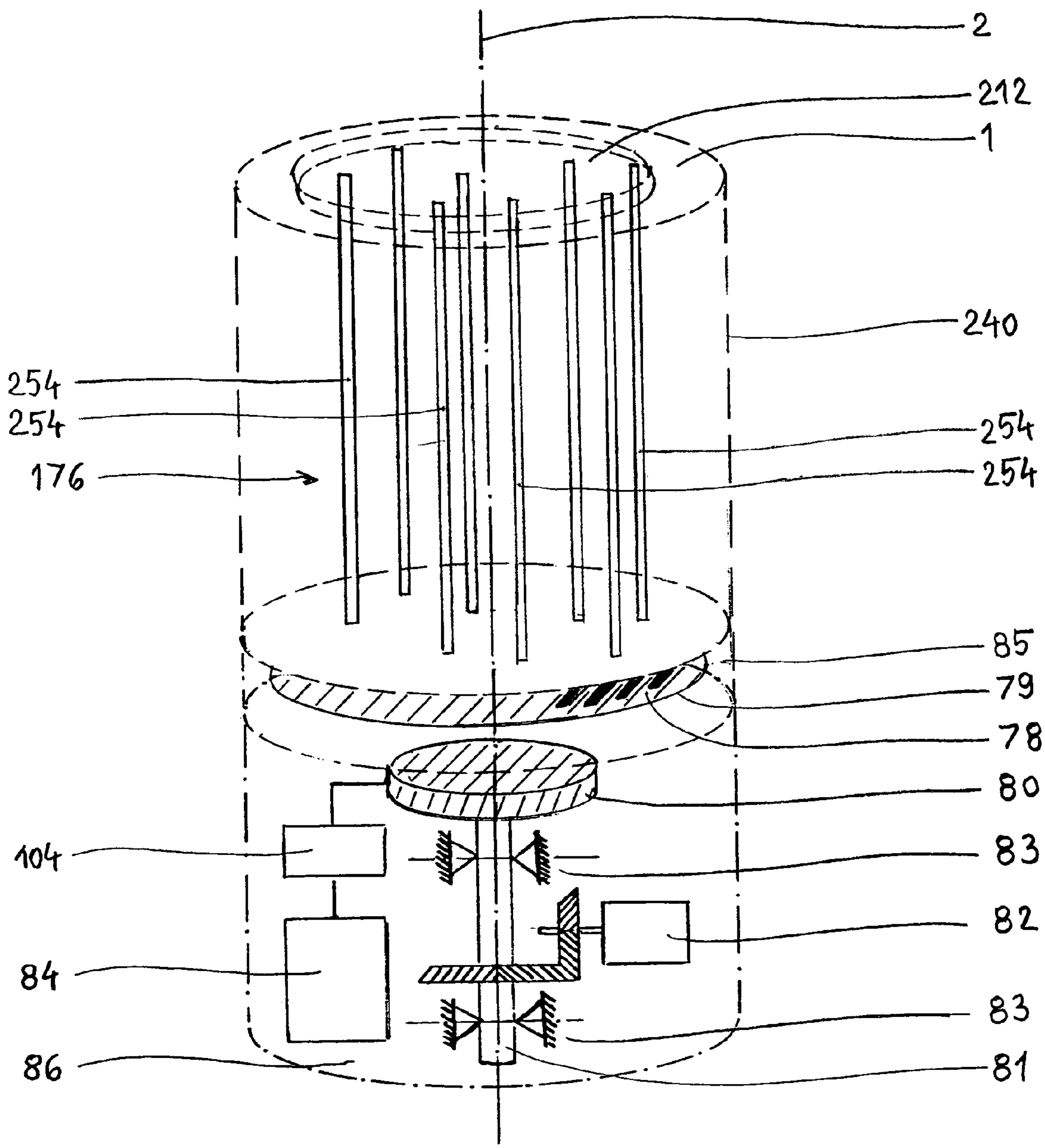
FIG. 34 is a general view of a device according to another alternate embodiment.
Figure 35:
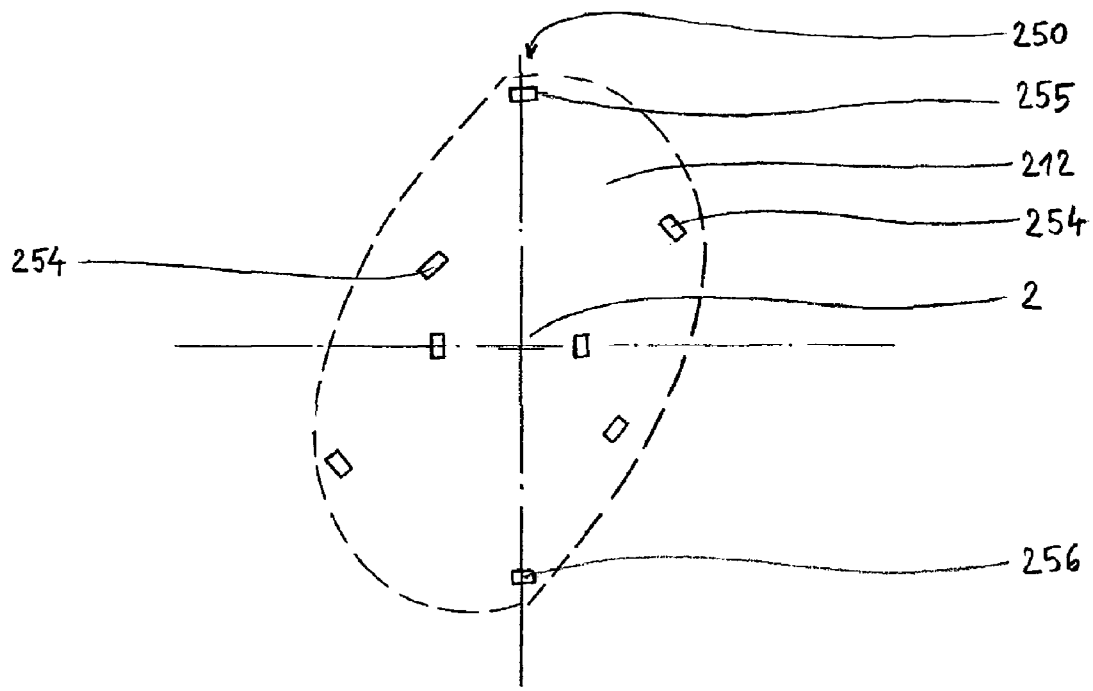
FIG. 35 is a cross-sectional view of an generator frame of the device shown in FIG. 34, showing generator pairs.
Figure 37:
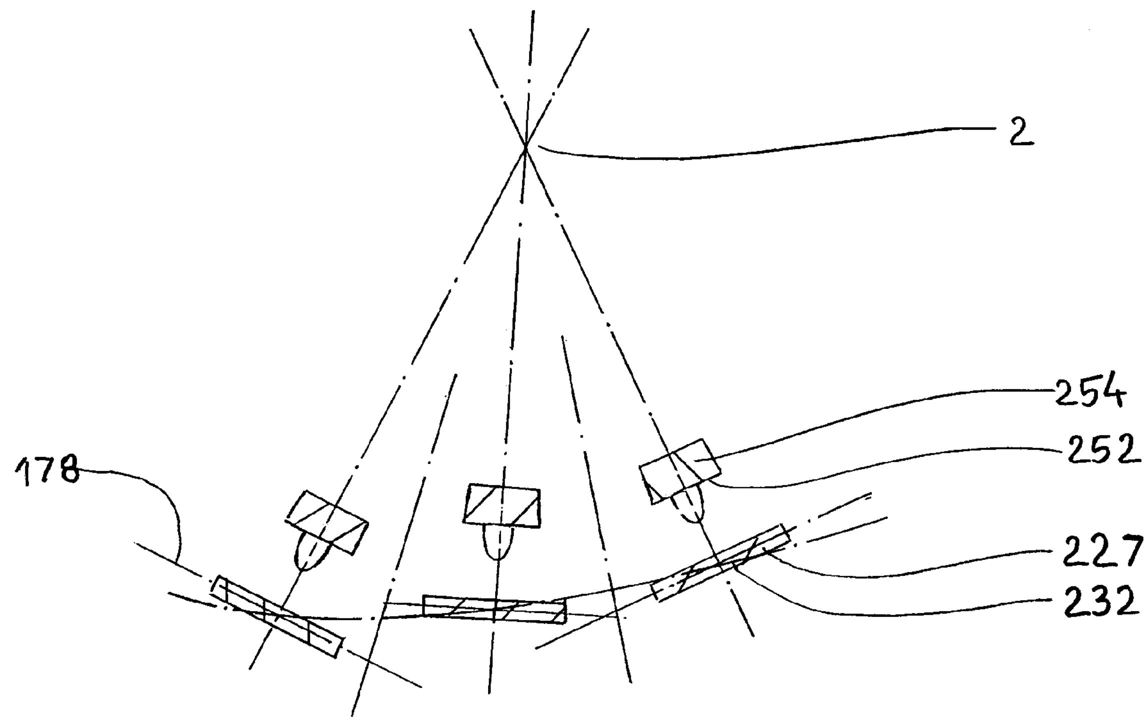
FIG. 37 is a cross-sectional detailed view of the generator frame shown in FIG. 35, showing light sources and light blocking means.

In another alternate embodiment of the present invention, the generator elements (254) are located at different distances from a central axis and are positioned with a distance therebetween, as shown in FIG. 34. A generator frame (176) is composed of the generator elements (254) and has a contiguous field of view of 360 degrees. The generator elements (254) are grouped in one or more generator pairs, as shown in FIG. 35. A generator pair (250) is composed of two of the generator elements (255) and (256) which are located mutually opposite with respect to the central axis of the device, wherein the generator elements of a generator pair have similar radial distances to the central axis of the device. A difference of the radial distances of the two generator elements of a same generator pair is preferably similar to a radial spatial resolution of the device. More particularly, the generator elements (255) and (256) would be adjacent if were located on a frame pattern line in the form of a non-linear curve. Each of the generator elements has preferably an exterior facet (252) opposite to the central axis of the device, as shown in FIG. 37. A multitude of light sources are coupled to the generator elements, wherein an axis light beam propagation is in a transversal radial direction on the central axis. Light blocking means (227) are located in front of the light sources with respect to the central axis, wherein the light blocking means and the light sources reside preferably in a same longitudinal axial plane. Cross-sections (232) of the light blocking means with a transversal plane are located on a non-linear curve (178). Eight generator elements are shown being located around the central axis with an angular opening of 45 degrees therebetween. Although only eight generator elements are shown, this should not limit the scope of the present invention. The generator elements are connected to positioning means (212) which can have such a shape as to counterbalance the placement of the generator elements.

Figure 36:
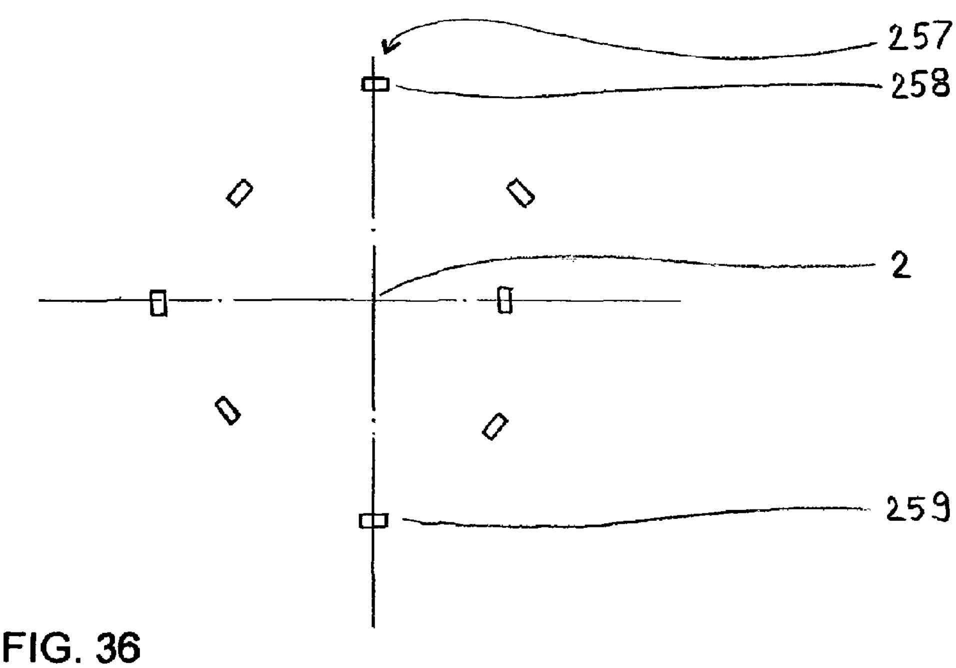
FIG. 36 is a cross-sectional view of an alternate generator frame of the device shown in FIG. 34, showing generator pairs.

Alternately, eight generator elements are located around the central axis with an angular opening of 45 degrees therebetween and are grouped in one or more generator pairs. A generator pair (257) is composed of two of the generator elements (258) and (259) which are located mutually opposite with respect to the central axis of the device, as shown in FIG. 36. The generator pairs have a similar value of the difference between radial distances to the central axis of the generator elements of generator pairs. The generator elements (258) and (259) would be opposite with respect to the central axis if were located on a frame pattern line in the form of a non-linear curve spanning an field of view of 360 degrees.

Figure 39:
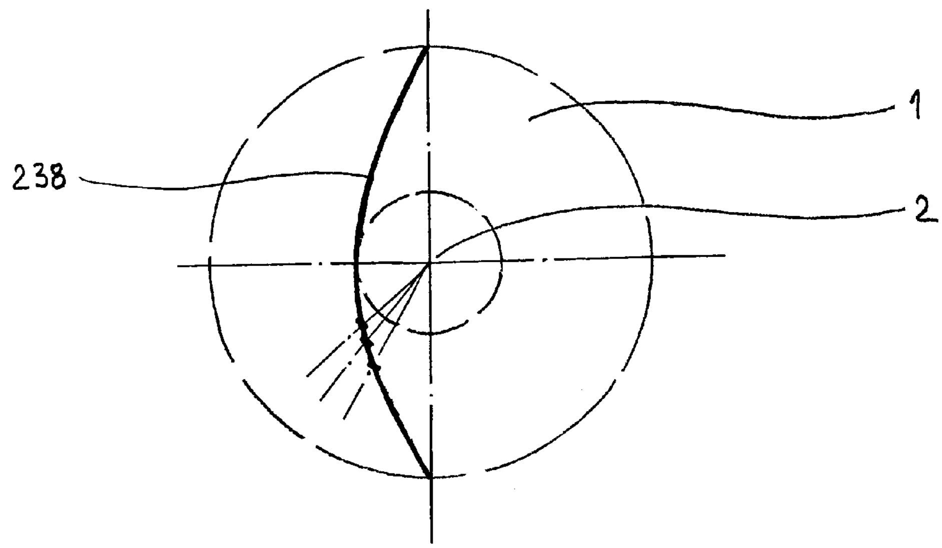
FIG. 39 is a cross-sectional detailed view of the generator frame shown in FIG. 38.
Figure 38:
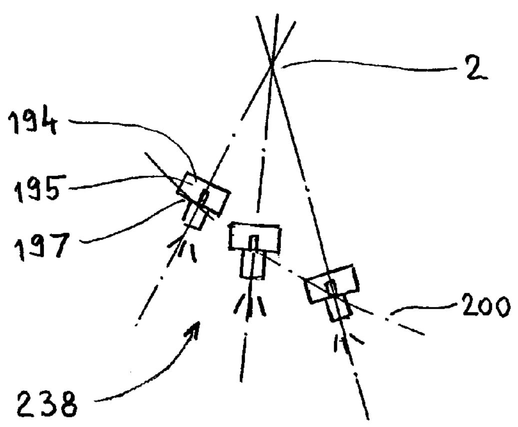
FIG. 38 is a cross-sectional view of a generator frame of a device according to another alternate embodiment.
Figure 40:
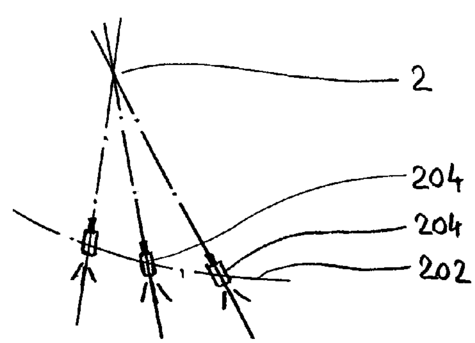
FIG. 40 is a cross-sectional view of an arrangement of light sources of the generator frame shown in FIG. 38.

In another alternate embodiment of the present invention, the generator elements (194) are located at different distances from a central axis (2) and are positioned with a distance therebetween, as shown in FIG. 38. A generator frame (238) is composed of the generator elements (194) and has a contiguous field of view of 180 degrees, as shown in FIG. 39. Cross-sections (195) of the generator elements (194) with a transversal plane are located on a non-linear curve. Each of the generator elements has preferably an exterior facet (197) opposite to the central axis of the device. Intersections of the exterior facets (197) of the generator elements with a transversal plane are located on a non-linear curve (200) which extends between two regions preferably located at extremities of the device on either side of the central axis and being intersected by a same longitudinal axial plane on the central axis. A plurality of light sources (204) is coupled to the generator elements, wherein the light sources are not residing in a same longitudinal axial semi-plane, as shown in FIG. 40. The light sources reside on a non-linear curve (202) in a transversal plane. In the case in which the light sources are composed of two or more light source elements having opposite directions of light beam propagation, the generator frame (238) has a contiguous field of view of 360 degrees.

Figure 41:
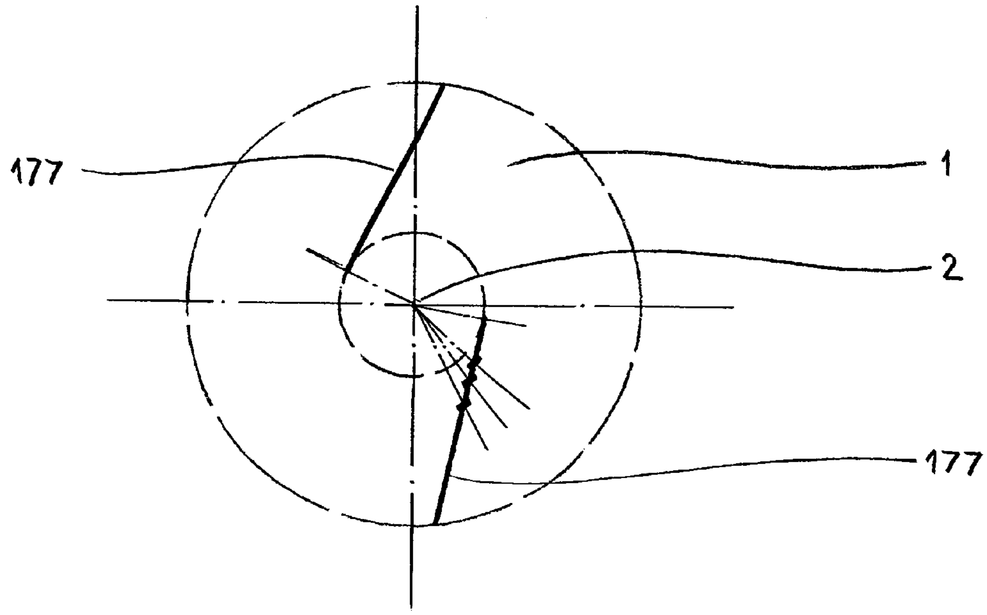
FIG. 41 is a cross-sectional view of a generator frame of a device according to another alternate embodiment.
Figure 42:
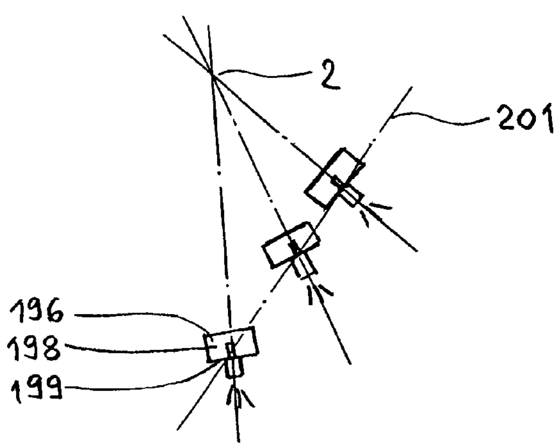
FIG. 42 is a cross-sectional detailed view of the generator frame shown in FIG. 41.
Figure 43:
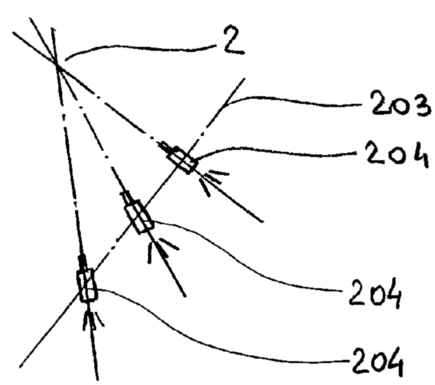
FIG. 43 is a cross-sectional view of an arrangement of light sources of the generator frame shown in FIG. 41.
Figure 44:
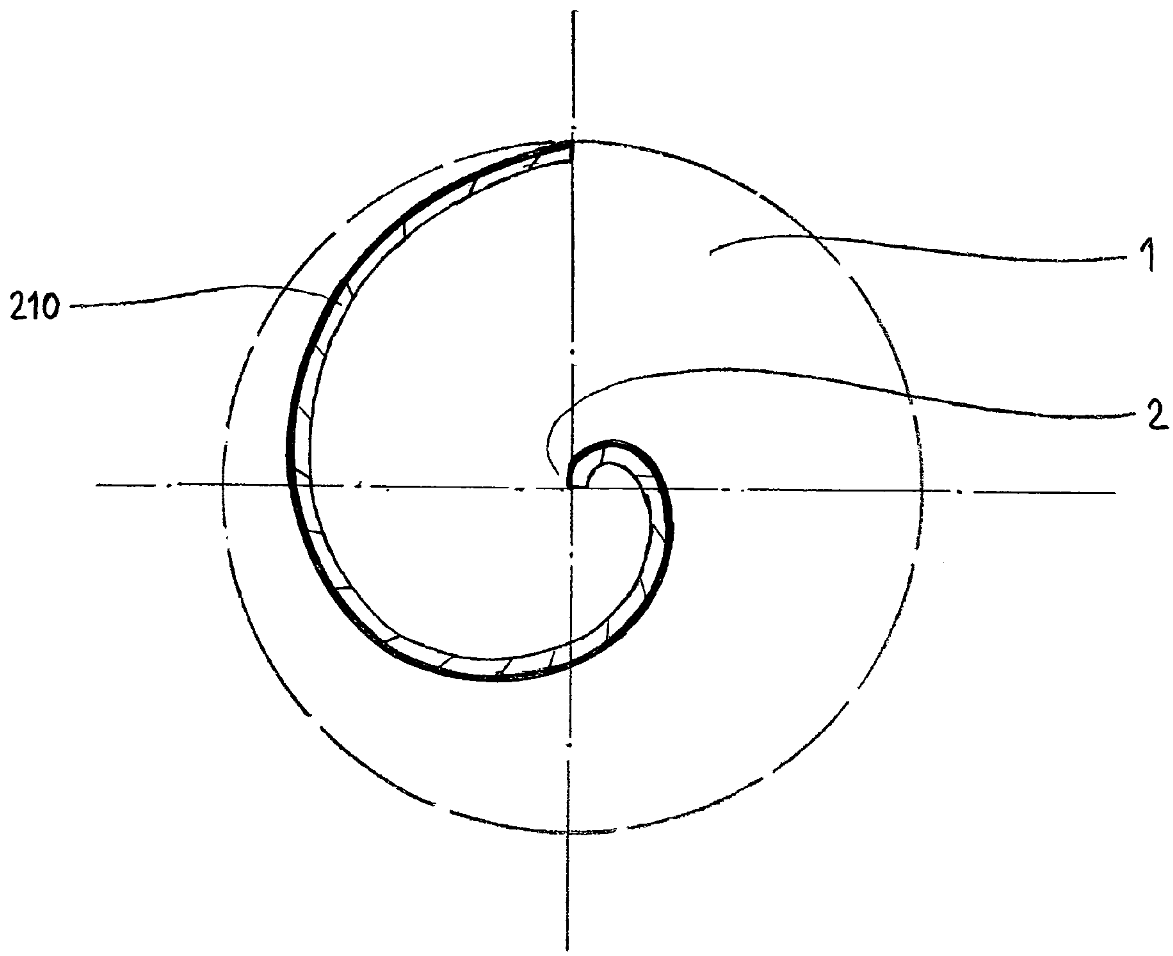
FIG. 44 is a cross-sectional view of a generator frame of a device according to another alternate embodiment.

In another alternate embodiment of the present invention, the generator elements (196) are located at different distances from a central axis (2) and are positioned with a distance therebetween, as shown in FIG. 42. At least one generator frame (177) is composed of the generator elements (254), as shown in FIG. 41. Cross-sections (198) of the generator elements with a transversal plane are located on a linear curve. Each of the generator elements has preferably an exterior facet opposite to the central axis of the device. Intersection of exterior facets (197) of the generator elements with a transversal plane are located on a linear curve (201) which does not reside in a longitudinal radial plane. A plurality of light sources (204) is coupled to the generator elements, wherein the light sources reside on a linear curve (203) in a transversal plane, as shown in FIG. 43. The light sources are not residing in a same longitudinal axial semi-plane. In the case in which two or more linear generator frames are used, orientations of the linear curves of the generator frames with respect to the central axis can be different.

In another alternate embodiment of the present invention, a generator frame (210) has a contiguous non-planar shape, as shown in FIG. 4A. A cross-section of the generator frame (210) in a transversal plane is a non-linear curve. The non-linear curve is preferably, but not limited to, a spiral, or an arc of parabola or hyperbola, or an arc of circle or ellipse. A plurality of light sources, such as, but not limited to, light-emitting diodes (LEDs), LED arrays, liquid crystal displays or laser diodes, are coupled or deposited to the generator frame, wherein the light sources are not residing in a same longitudinal axial semi-plane.

Figure 45:
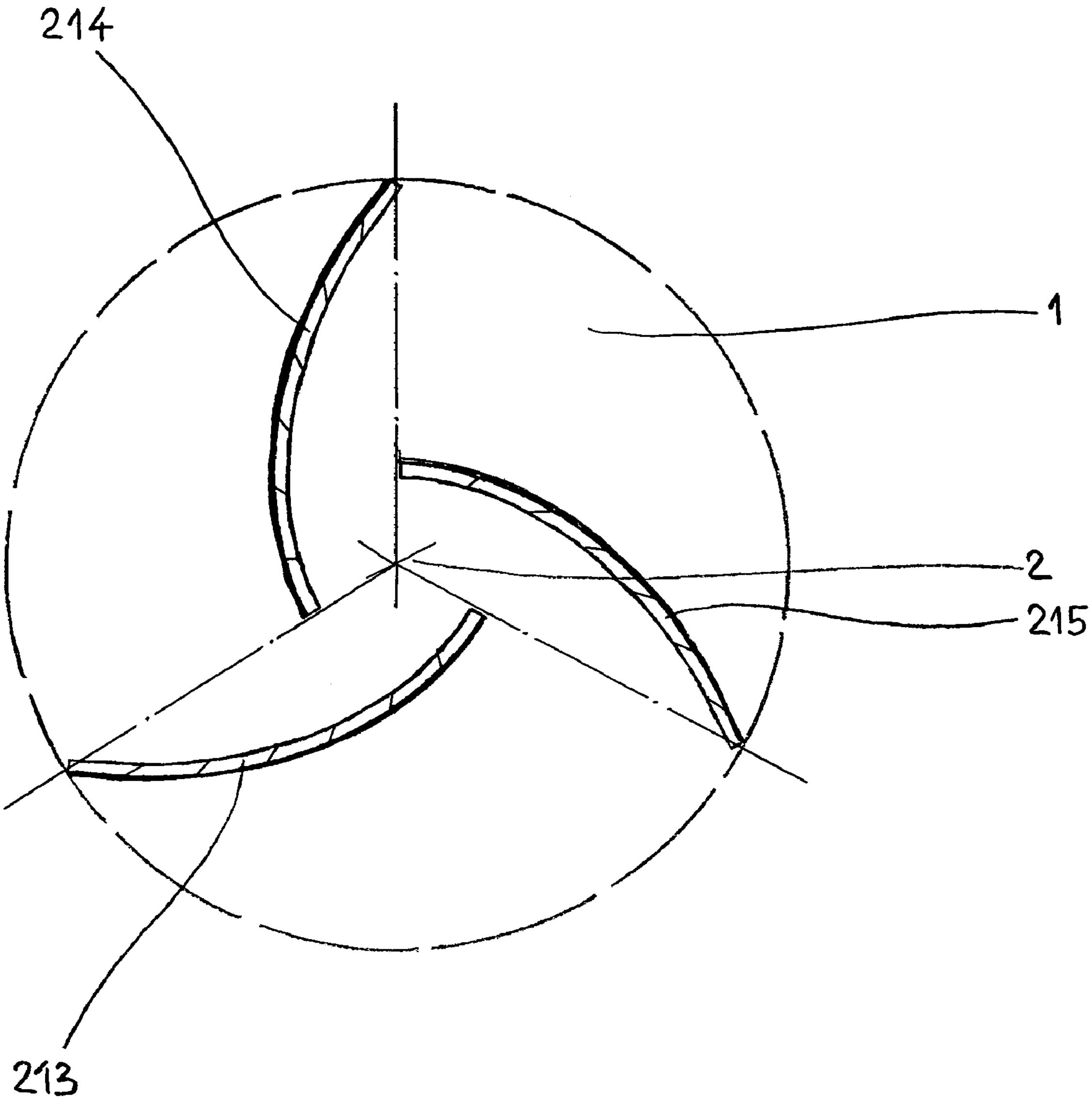
FIG. 45 is a cross-sectional view of a generator frame of a device according to another alternate embodiment.

In another alternate embodiment of the present invention, at least two generator frames (213) and (214) have a contiguous non-planar shape, as shown in FIG. 45. In the case of three generator frames (213), (214) and (215), each generator frame has an field of view of 120 degrees. A cross-section of a generator frame in a transversal plane is a non-linear curve. The non-linear curve is preferably, but not limited to, a spiral, or an arc of parabola or hyperbola, or an arc of circle or ellipse. A plurality of light sources are coupled or deposited to the generator frames, wherein the light sources are not residing in a same longitudinal axial semi-plane.

Although several embodiments of the invention have been illustrated in the accompanying drawings and described in the foregoing Detailed Description, it will be obvious to those skilled in the art that the invention is not limited to the embodiments disclosed, but is capable of many rearrangements, modifications and substitutions of parts and elements without departing from the scope and spirit of the invention.

What is claimed is:

1. A device for volumetric image reconstruction having a volumetric space surrounding a central axis of said device and a multitude of light sources movable around said central axis, said device being composed of at least two rows of light sources intersecting a longitudinal plane on said central axis and of at least two columns of light sources intersecting a transversal plane on said central axis, characterized in that said light sources are not residing in a same longitudinal axial semi-plane.

2. A device according to claim 1, wherein adjacent columns of light sources are not residing in a same longitudinal axial semi-plane, each of said light sources having an unrestricted field of view in a direction of light beam propagation toward extremities of said device.

3. A device according to claim 1, wherein intersections of adjacent light sources with a transversal plane on said central axis are located at different angular openings with respect to said central axis.

4. A device according to claim 1, wherein intersections of three or more of said light sources with a transversal plane on said central axis are located on at least one non-linear curve.

5. A device according to claim 1, wherein said light sources have one or more light source emitters which generate light, said device in which intersections of light source emitters of adjacent light sources with a transversal plane on said central axis are located at different angular openings with respect to said central axis.

6. A device according to claim 1, wherein said light sources have one or more light source emitters which generate light, said device in which intersections of light source emitters of three or more of said light sources with a transversal plane on said central axis are located on at least one non-linear curve.

7. A device according to claim 4, wherein said non-linear curve extends from a vicinity of said central axis to extremities of said volumetric space, said non-linear curve being preferably a spiral, or an arc of circle or ellipse, or an arc of parabola or hyperbola.

8. A device according to claim 4, wherein said non-linear curve extends between two regions preferably located at extremities of said device on either side of said central axis and being intersected by a same longitudinal axial plane on said central axis.

9. A device according to claim 1, wherein an axis of light beam propagation of said light sources resides in a transversal radial direction with respect to said central axis, axes of light beam propagation of adjacent light sources residing in a transversal plane being different.

10. A device for volumetric image reconstruction having a volumetric space surrounding a central axis of said device and a multitude of light sources movable around said central axis, said device being composed of at least two rows of light sources intersecting a longitudinal plane on said central axis and of at least two columns of light sources intersecting a transversal plane on said central axis, characterized in that a principal optical axis of said light sources is in a transversal radial direction with respect to said central axis.

11. A device according to claim 10, wherein an axis of light beam propagation of said light sources resides in a transversal radial direction with respect to said central axis.

12. A device according to claim 10, wherein a direction of light beam propagation of said light sources is opposite to a spatial region located in a vicinity of said central axis.

13. A device according to claim 10, wherein axes of light beam propagation of adjacent light sources residing in a same transversal plane are not residing in a same longitudinal axial semi-plane.

14. A device according to claim 10, wherein each of said light sources is composed of at least two light source elements, said device in which an axis of light beam propagation of at least one of said light source elements is residing in a transversal radial direction.

15. A device according to claim 10, wherein each of said light sources is composed of at least two light source elements having axes of light beam propagation spatially distributed around a principal optical axis of said light source, said device in which a light beam is independently generated by one of said light source elements in an elementary access duration.

16. A device according to claim 10, wherein each of said light sources is composed of at least two light source elements having directions of light beam propagation mutually opposite.

17. A device according to claim 10, wherein light blocking means and said light sources reside in a same longitudinal axial plane and a cross-section of said light blocking means with a transversal plane on said central axis is residing on a non-linear curve, said device in which said light blocking means controls an intensity and an axis of propagation of light beams generated by said light sources in an elementary access duration.

18. A device for volumetric image reconstruction having a volumetric space surrounding a central axis of said device and a multitude of light sources movable around said central axis, said device being composed of at least two rows of light sources intersecting a longitudinal plane on said central axis and of at least two columns of light sources intersecting a transversal plane on said central axis, said device in which a light beam is generated by said light sources in an elementary access duration, comprising a variable elementary access duration of said light sources.

19. A device according to claim 18, wherein an elementary access duration of said light sources is variable along said rows of light sources from a vicinity of said central axis to extremities of said device.

20. A device according to claim 19, wherein an elementary access duration of said light sources is decreasing from a vicinity of said central axis to extremities of said volumetric space.

21. A device according to claim 20, wherein an elementary access duration of said light sources is inverse proportional to a radius of said light sources with respect to said central axis.

22. A device according to claim 18, including at least two column partitions of light sources in a transversal plane on said central axis, wherein each of said column partition of light sources is composed of at least two of said columns of light sources, said device in which said light sources located in adjacent column partitions have a different elementary access duration and in which said light sources located in one of said column partitions have a same elementary access duration.

23. A device according to claim 22, wherein an elementary access duration of said light sources located in one of said column partitions is smaller than an elementary access duration of said light sources located in an adjacent column partition in a direction toward said central axis.

24. A device according to claim 23, wherein an elementary access duration of said light sources located in one of said column partitions is between 1:1 to 1:4 of an elementary access duration of said light sources located in an adjacent column partition in a direction toward said central axis.

25. A device for volumetric image reconstruction having a volumetric space surrounding a central axis of said device and a multitude of light sources movable around said central axis, characterized in that said light sources are coupled to at least two generator elements located at different distances from said central axis and movable around said central axis.

26. A device according to claim 25, wherein said generator elements have an elongated shape in a longitudinal direction with respect to said central axis and cross-sections of three or more of said generator elements with a transversal plane on said central axis are located on a non-linear curve.

27. A device according to claim 25, wherein each of said generator elements has one or more exterior facets opposite to said central axis, said light sources being coupled to said exterior facets of said generator elements, said device in which intersections of exterior facets of three or more of said generator elements with a transversal plane are located on a non-linear curve.

28. A device according to claim 25, wherein said generator elements have an elongated shape in a longitudinal direction with respect to said central axis and cross-sections of three or more of said generator elements with a transversal plane on said central axis are residing on a linear curve which does not intersect said central axis.

29. A device according to claim 27, wherein said non-linear curve extends from a vicinity of said central axis to extremities of said device, said device in which said non-linear curve is a spiral or an arc of circle or ellipse or an arc of parabola or hyperbola.

30. A device according to claim 27, wherein said non-linear curve extends between two regions located at extremities of said device on either side of said central axis and being intersected by a same longitudinal axial plane on said central axis.

31. A device according to claim 27, wherein said generator elements are positioned with a distance therebetween.

32. A device according to claim 27, wherein said generator elements are positioned without a distance therebetween and employ at least one contiguous generator frame, said device in which an exterior facet of said generator frame is composed of exterior facets of said generator elements, said device in which an intersection of said exterior facet of said generator frame is residing on a non-linear curve.

33. A device according to claim 25, further being composed of a device driving module which accesses periodically or individually said light sources, said device further being composed of an image processing system which generates, receives, transmits, processes or stores a data content of a volumetric image and transfers said data content to said device driving module, wherein said image processing system is coupled to said device driving module through at least one optical coupling means.

34. A method for volumetric image reconstruction including moving a multitude of light sources around a central axis of a volumetric space, generating periodically a light beam by each of said light sources in an elementary access duration, scanning and employing a volumetric image element by one or more of said light sources in one or more elementary access durations, employing a volumetric image space composed of a multitude of volumetric image elements in said volumetric space, further including employing at least two surface layers of volumetric image elements intersecting a longitudinal plane on said central axis and extending from a vicinity of said central axis to extremities of said volumetric space and at least two volume layers of volumetric image elements intersecting a transversal plane on said central axis and extending from a lower side to an upper side of said volumetric space, said method in which said volumetric image elements have a height in a longitudinal plane on said central axis, a radial dimension in a transversal plane on said central axis, an arc length in a transversal plane on said central axis, an angular span in a transversal plane on said central axis and with respect to said central axis, characterized in that an angular span of said volumetric image elements is variable.

35. A method according to claim 34, wherein an angular span of said volumetric image elements is decreasing in a transversal plane on said central axis from a vicinity of said central axis to extremities of said volumetric space.

36. A method according to claim 35, wherein an angular span of said volumetric image elements is inverse proportional to a radius of said volumetric image elements to said central axis.

37. A method according to claim 35, wherein an arc length of said volumetric image elements is constant or decreasing in a transversal plane from a vicinity of said central axis to extremities of said volumetric space.

38. A method according to claim 34, wherein an arc length of said volumetric image elements is variable from a vicinity of said central axis to extremities of said volumetric space.

39. A method according to claim 34, including employing at least two volume partitions of volumetric image elements, each of said volume partitions being composed of at least two of said volume layers of volumetric image elements, said method in which said volumetric image elements residing in adjacent volume partitions have a different angular span and in which said volumetric image elements located in one of said volume partitions have an equal angular span.

40. A method according to claim 39, wherein an arc length of said volumetric image elements located in one of said volume partitions is increasing from a lower radius to a higher radius of said volumetric image elements with respect to said central axis.

41. A method according to claim 39, wherein an arc length of said volumetric image elements located at a lower radius with respect to said central axis in one of said volume partitions is smaller than an arc length of said volumetric image elements located at a higher radius with respect to said central axis in an adjacent volume partition in a direction toward said central axis.

42. A method according to claim 41, wherein an arc length of said volumetric image elements located at a lower radius with respect to said central axis in one of said volume partitions is between 1:1 to 1:4 of an arc length of said volumetric image elements located at a higher radius with respect to said central axis in an adjacent volume partition in a direction toward said central axis.

43. A method for volumetric image reconstruction including moving a multitude of light sources around a central axis of a volumetric space, generating periodically a light beam by each of said light sources in an elementary access duration, scanning and employing a volumetric image element by one or more of said light sources in one or more elementary access durations, employing a volumetric image space composed of a multitude of volumetric image elements in said volumetric space, further including employing at least two surface layers of volumetric image elements intersecting a longitudinal plane on said central axis and extending from a vicinity of said central axis to extremities of said volumetric space and at least two volume layers of volumetric image elements intersecting a transversal plane on said central axis and extending from a lower side to an upper side of said volumetric space, said method in which said volumetric image elements have a height in a longitudinal plane on said central axis, a radial dimension in a transversal plane on said central axis, an arc length in a transversal plane on said central axis, an angular span in a transversal plane on said central axis and with respect to said central axis, characterized in that said volumetric image elements employed in a same elementary access duration are not residing in a same longitudinal axial semi-plane.

44. A method according to claim 43, wherein a principal optical axis of said volumetric image elements is in a transversal radial direction with respect to said central axis.

45. A method according to claim 43, wherein a principal optical axis of said volumetric image elements has a direction opposite to a spatial region located in a vicinity of said central axis, said method employing an unrestricted field of view of said volumetric image elements in a transversal radial direction toward extremities of said volumetric space.

46. A method according to claim 43, wherein intersections of three or more of said volumetric image elements with a transversal plane on said central axis are located on at least one non-linear curve.

47. A method according to claim 46, wherein said non-linear curve extends from a vicinity of said central axis to extremities of said volumetric space, said method in which said non-linear curve is preferably a spiral, or an arc of circle or ellipse, or an arc of parabola or hyperbola.

48. A method according to claim 43, further including reconstructing a volumetric image in said volumetric space, said method employing a contiguous field of view of said volumetric image at least in a center region of said volumetric space.

49. A method according to claim 43, wherein an angular span of said volumetric image elements is constant from a vicinity of said central axis to extremities of said volumetric space.

* * * * *